(12) United States Patent
Chu et al.

(10) Patent No.: US 10,263,961 B2
(45) Date of Patent: Apr. 16, 2019

(54) SECURITY CHIP AND APPLICATION PROCESSOR

(71) Applicant: Samsung Electronics Co., Ltd., Suwon-si, Gyeonggi-do (KR)

(72) Inventors: Youn-sung Chu, Hwaseong-si (KR); Min-ja Han, Seoul (KR); Kyung-jin Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 170 days.

(21) Appl. No.: 15/357,228

(22) Filed: Nov. 21, 2016

(65) Prior Publication Data

US 2017/0214662 A1 Jul. 27, 2017

(30) Foreign Application Priority Data

Jan. 21, 2016 (KR) ........................ 10-2016-0007545

(51) Int. Cl.
| | |
|---|---|
| *H04L 29/06* | (2006.01) |
| *H04L 9/00* | (2006.01) |
| *H04L 9/08* | (2006.01) |
| *H04L 9/32* | (2006.01) |

(52) U.S. Cl.
CPC ......... *H04L 63/0428* (2013.01); *H04L 9/006* (2013.01); *H04L 9/0841* (2013.01); *H04L 9/0869* (2013.01); *H04L 9/0877* (2013.01); *H04L 9/3263* (2013.01); *H04L 63/0823* (2013.01); *H04L 63/0869* (2013.01)

(58) Field of Classification Search
CPC ............ H04L 63/0428; H04L 63/0869; H04L 63/0823; H04L 9/0877; H04L 9/006; H04L 9/3263; H04L 9/0869; H04L 9/0841
See application file for complete search history.

(56) References Cited

U.S. PATENT DOCUMENTS

| | | | |
|---|---|---|---|
| 8,578,167 B2 | 11/2013 | Miyamoto et al. | |
| 8,578,467 B2 | 11/2013 | Ronda et al. | |
| 8,621,212 B2 | 12/2013 | Lim et al. | |
| 8,971,533 B2 | 3/2015 | Wall et al. | |
| 2004/0039911 A1* | 2/2004 | Oka | ........................ G06F 21/10 713/175 |
| 2009/0041252 A1* | 2/2009 | Hanna | ..................... H04L 63/08 380/278 |

(Continued)

*Primary Examiner* — John B King
(74) *Attorney, Agent, or Firm* — Harness, Dickey & Pierce, P.L.C.

(57) ABSTRACT

A security chip and an application processor may be included in a device configured to engage in encrypted communications with an external client, including public key infrastructure communications, in an environment where a certificate authority is absent. The security chip may provide the application processor with a device public key from among a pair of device keys related to public key infrastructure communications, receive a request from the application processor to generate a digital signature on a certificate form including the device public key, provide the application processor with a digital signature generated based on an encryption operation using a certificate authority private key, and receive and store a certificate including the digital signature from the application processor.

15 Claims, 22 Drawing Sheets

(56) References Cited

U.S. PATENT DOCUMENTS

| | | | |
|---|---|---|---|
| 2009/0167489 A1* | 7/2009 | Nan | H04L 9/3013 340/5.8 |
| 2010/0250944 A1* | 9/2010 | Suzuki | G06F 21/32 713/172 |
| 2011/0016327 A1* | 1/2011 | Suzuki | G06F 21/32 713/186 |
| 2012/0019640 A1* | 1/2012 | Choudury | H04N 5/2251 348/61 |
| 2012/0233685 A1 | 9/2012 | Palanigounder et al. | |
| 2014/0136350 A1 | 5/2014 | Savolainen | |
| 2015/0046715 A1 | 2/2015 | Ignatchenko | |
| 2015/0134958 A1 | 5/2015 | Merrien et al. | |
| 2015/0149768 A1 | 5/2015 | Klieman et al. | |
| 2015/0172255 A1 | 6/2015 | Warnez et al. | |
| 2017/0078255 A1* | 3/2017 | Nejadian | H04L 63/0464 |

* cited by examiner

SECURITY CHIP AND APPLICATION PROCESSOR

CROSS-REFERENCE TO RELATED APPLICATION

This application claims the benefit of Korean Patent Application No. 10-2016-0007545, filed on Jan. 21, 2016, in the Korean Intellectual Property Office, the disclosure of which is incorporated herein in its entirety by reference.

BACKGROUND

The inventive concepts relate to a security chip, and more particularly, to a security chip, an application processor, a device including the security chip, and an operating method of the security chip.

With regard to a public key infrastructure (PKI), data transmitted between devices is encrypted by using a public key and is decrypted by using a private key or a secret key. Also, the public key is transmitted through a certificate exchange process, and a certificate is generated by a separate certificate authority (CA).

However, the intervention of the CA may cause an increase in costs, and also, there is a risk of exposing a private key that may be stored on a device.

SUMMARY

Some example embodiments of the inventive concepts include a security chip, an application processor, a device including the security chip, and an operating method of the security chip, whereby the costs for building a public key-based system and a possibility of exposing important information such as a private key may be reduced.

According to some example embodiments, an operating method of a security chip may include performing, at the security chip: transmitting, to an application processor (AP), a device public key of a device key pair, the device key pair associated with public key infrastructure communications, receiving a request, from the AP, to generate a digital signature on a certificate form, the certificate form including the device public key, transmitting the digital signature to the AP, based on the received request to generate the digital signature, the digital signature generated based on an encryption operation using a certificate authority (CA) private key, receiving a certificate from the AP, the certificate including the digital signature, and storing the certificate at the security chip.

According to some example embodiments, an operating method of an application processor (AP), wherein the AP is configured to communicate with a security chip storing one or more keys associated with public key infrastructure (PKI) communications, may include performing, at the AP: generating a certificate form based on receiving a device public key from the security chip, the certificate form including the device public key, transmitting a request, to the security chip, to generate a digital signature on the generated certificate form, receiving the digital signature from the security chip, the digital signature generated according to a certificate authority (CA) private key stored in the security chip, and generating a certificate that includes the digital signature received from the security chip.

According to some example embodiments, an operating method of a security chip, wherein the security chip is configured to communicate with an application processor (AP) in a common device, the security chip further configured to store a certificate, the certificate including a device public key and a device private key, may include performing, at the security chip: transmitting, to the AP, first random data and the certificate according to a handshake process associated with an external client; receiving first information from the external client through the AP, the first information being encrypted according to the device public key; decrypting the first information according to the device private key; and transmitting second information to the AP, based on performing a key agreement operation according to the first information, the second information associated with generation of a session key at the AP.

According to some example embodiments, a security chip configured to communicate with an application processor (AP), the AP configured to perform public key infrastructure (PKI) communications, may include a memory storing computer readable instructions, and a processor. The processor may be configured to execute the computer readable instructions to apply a digital signature to a certificate form according to a request received from the AP, the certificate form including a device public key, receive a certificate from the AP, the certificate including the digital signature, store the received certificate, transmit the certificate to the AP in a handshake process associated with to an external device, and process at least one processing operation, from a plurality of processing operations associated with a security protocol, based on the at least one processing operation being delegated to the security chip by the AP.

According to some example embodiments, a method may include generating a certificate form based on a device public key received from a semiconductor chip, transmitting a request, to the semiconductor chip, to generate a digital signature associated with the certificate form, and generating a certificate that includes the requested digital signature, based on receiving the requested digital signal from the semiconductor chip, the digital signature being generated at the semiconductor chip according to a certificate authority (CA) private key.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Hereinafter, example embodiments will be described in detail with reference to the accompanying drawings.

Figure 1:
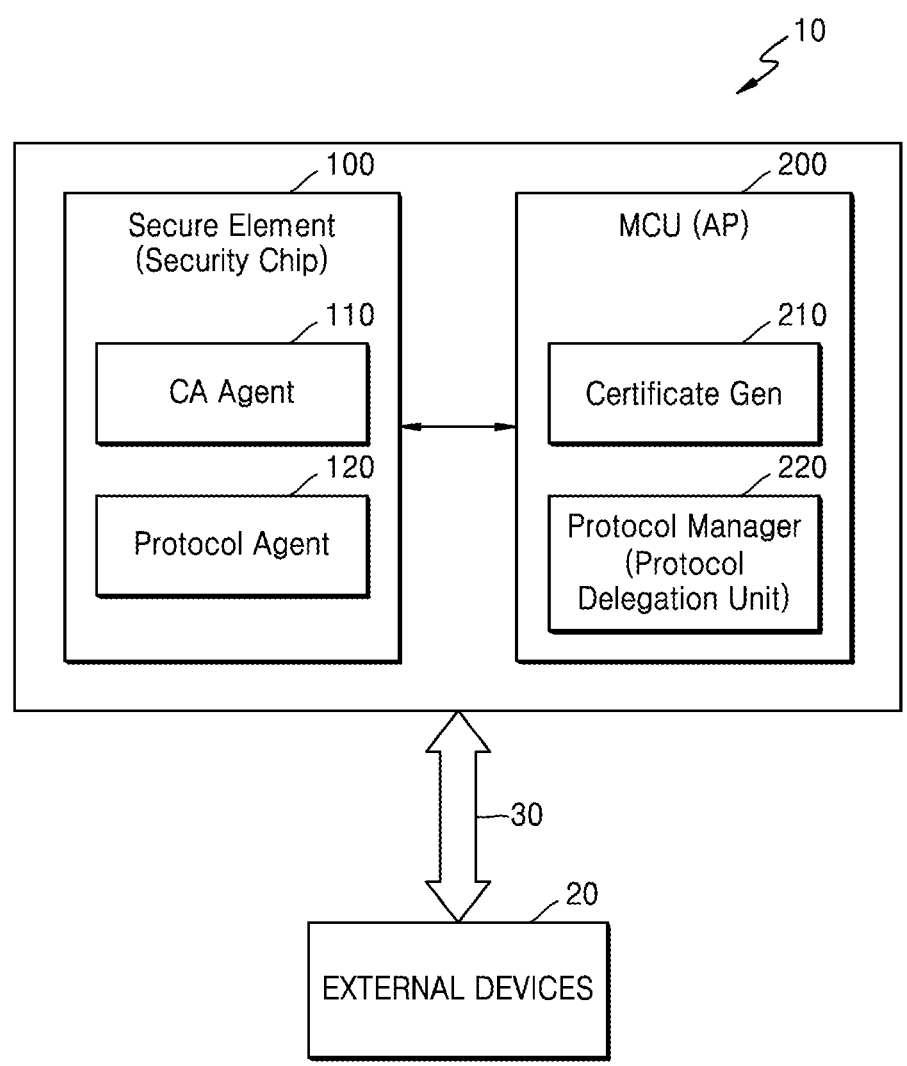
FIG. 1 is a block diagram of a device according to some example embodiments.

FIG. 1 is a block diagram of a device 10 according to some example embodiments.

As illustrated in FIG. 1, the device 10 may be an electronic device configured to process data, such as a mobile device, a smart phone, a personal digital assistant (PDA), a personal computer (PC), a tablet PC, a notebook, a net-book, or a household appliance.

The device 10 may include a secure element (SE) 100 and a microcontroller unit (MCU) 200. The MCU 200 may be, for example, an application processor (AP). The MCU (or AP) 200 may be a system on chip (SoC). The SE 100 may be a semiconductor chip separated from the MCU 200, and may be, for example, an integrated circuit (IC). Accordingly, the SE 100 may also be referred to as a security chip.

The MCU 200 may process various types of programs and/or data stored in the device 10 and may control an overall operation of the device 10. According to some example embodiments, various types of programs, such as applications, may be installed on the device 10, and some programs may be programs utilizing security, for example, programs utilizing cryptographic communication. As a program utilizing security is executed under control of the MCU 200, encryption and decryption operations may be performed on data transmitted to and received from an external server or client.

According to some example embodiments, the device 10 may communicate with external devices 20 via a public key infrastructure (PKI) 30. In some example embodiments, if and/or when the device 10 operates as a server during public key infrastructure (PKI) 30 communications, the device 10 may provide an external client (e.g., external device 20) with a certificate including a public key (PK) among a key pair that includes the public key (PK) and a private key (SK). In addition, the device 10 may receive, from an external client, data encrypted by using the public key (PK) and the device 10 may obtain original data by performing a decryption operation on the encrypted data by using the private key (SK).

The public key (PK) and the private key (SK) stored by the device 10 may also be referred to as a device public key (DEV-PK) and a device private key (DEV-SK), respectively. In addition, a device public key (DEV-PK) and a device private key (DEV-SK) generated by a server may also be referred to as a server public key and a server private key, respectively.

If and/or when the device 10 operates as a client, the device 10 may receive a certificate including a public key (PK) among a key pair of an external device 20 (e.g., an external server), encrypt data by using the public key (PK), and transmit the encrypted data to the external server. However, this operation is merely an example, and the device 10 may encrypt or decrypt data by using various schemes.

According to some example embodiments, the device 10 may perform PKI communications in an environment where a certificate authority (CA) does not exist. For example, the device 10 may generate a certificate and perform communications based on a security protocol, such as secure socket layer (SSL) and transport layer security (TLS), by using the generated certificate. As a result, a functioning of a computer in which the device 10 is included, including a computer that is the device 10, may be improved, as the device 10 is configured to perform PKI communications in an environment where a CA does not exist. In addition, network communication involving the device 10 may be improved based on enabling PKI communications associated with the device 10 in an environment where a CA does not exist. In addition, based on the device 10 being configured to perform PKI communications in an environment where a CA does not exist, a risk of exposing a private key that may be stored on the device 10 is reduced, thereby improving encrypted network communications, including PKI communications, by reducing a risk that encrypted network communications could be compromised. In addition, by enabling PKI communications in an environment where a CA does not exist, computer functioning is improved by reducing the computing requirements and costs associated with the presence and intervention of a separate CA in encrypted network communications (e.g., PKI communications).

According to some example embodiments, the SE 100 may include a CA agent 110 and a protocol agent 120. The MCU 200 may include a certificate generator 210 and a protocol manager 220. Components included in the SE 100 are illustrated as blocks according to functions thereof. In practice, the SE 100 may include various types of components. Similarly, components included in the MCU 200 are illustrated as blocks according to functions thereof. In practice, the MCU 200 may include various types of components. In some example embodiments, one or more of the SE 100 and the MCU 200 may include at least one memory storing computer-readable instructions and at least one processor configured to execute the computer-readable instructions to perform the functions associated with one or more of the components and/or blocks included in the respective one or more of the SE 100 and the MCU 200.

The SE 100 may include a processor or an encryption engine, and various internal functions of the SE 100 may be implemented by at least one of embedded hardware and embedded software. The embedded hardware and/or software comprising the SE 100 may perform operations related to certificate generation and operations related to encryption and decryption in the PKI.

The SE 100 may include a component configured to protect internal information from external attacks. For example, the SE 100 may include a protection component implemented by hardware. The protection component may deny an external access to internal information of the SE 100. In some example embodiments, if and/or when the internal information of the SE 100 is accessed from the outside, the protection component may prevent leakage of original information by changing the internal information of the SE 100.

One or more keys related to the PKI communications may be installed on and stored in the SE 100, and various operations using the stored one or more keys may be performed. For example, the SE 100 may store a private key related to certificate generation. The private key related to the certificate generation performs a function identical or similar to a CA private key issued by a CA. Therefore, the private key related to the certificate generation, which is stored in the SE 100, may also be referred to as a CA private key (CA-SK). In some example embodiments, the private key related to the certificate generation may be defined by other terms, for example, a certificate private key.

The SE 100 may store a key pair (e.g., a device public key (DEV-PK) and a device private key (DEV-SK)) for performing the PKI communications. For example, the SE 100 may store a key pair installed in a manufacturing process thereof. In some example embodiments, the SE 100 may include software (not illustrated) that generates the key pair, and a device public key (DEV-PK) and a device private key (DEV-SK) may be generated when the SE 100 is initially driven.

The CA agent 110 may perform at least one operation in relation to the certificate generation. For example, the certificate generator 210 of the MCU 200 may generate a certificate form including various types of information utilized for the certificate and the certificate generator 210 may provide the generated certificate form to the CA agent 110. According to some example embodiments, the certificate generator 210 may calculate a hash value of the certificate form by using a hash function and provide the calculated hash value to the CA agent 110. According to some example embodiments, the certificate generator 210 may further generate a message authentication code (MAC) of the certificate form and provide the generated MAC to the CA agent 110. The CA agent 110 may generate a digital signature encrypted by using the CA private key (CA-SK) stored in the SE 100 and provide the digital signature to the MCU 200.

The certificate generator 210 may generate various types of certificates. For example, the certificate generator 210 may generate a certificate based on the X.509 standard, and the certificate may include a version of the certificate, a serial number of the certificate, an issuer signature, issuer information, a validity period of the certificate, subject (or device) information, and a device public key. The certificate generator 210 may request the SE 100 to provide (e.g., transmit) the device public key (DEV-PK) and may insert the device public key (DEV-PK) into the certificate form.

The certificate generator 210 may generate a final certificate (for example, an X.509 certificate) based on attaching the digital signature provided by the CA agent 110 to the certificate form. The certificate generator 210 may provide the generated certificate to the SE 100, and the certificate may be stored in the SE 100. According to some example embodiments, the certificate may be stored in the protocol agent 120. In some example embodiments, the certificate including the digital signature may be stored in the MCU 200.

The generated certificate may be provided to an external client in accordance with a public key-based protocol such as TLS. The external client (e.g., external device 20) may verify the validity of the certificate by using the certificate public key. The certificate public key is information that need not be kept secret. The certificate public key may be prestored in the process of manufacturing the external client, or the external client may access an external server and download the certificate public key from the external server.

The device 10 may communicate with an external device 20 in accordance with a security protocol such as TLS. The protocol manager 220 of the MCU 200 may manage various processing operations based on a certain protocol. According to some example embodiments, the protocol manager 220 may process one or more of the various processing operations based on the certain protocol and request the protocol agent 120 to perform one or more of the various processing operations. That is, the protocol manager 220 may delegate one or more of the various processing operations based on the certain protocol, to the SE 100. In this regard, the protocol manager 220 may also be referred to as a protocol delegation unit.

The protocol agent 120 of the SE 100 may perform a protocol processing operation delegated by the protocol manager 220. For example, in the PKI communications, an operation using important information utilized to be kept secret may be performed by the protocol agent 120, and a result of the operation may be provided to the protocol manager 220.

For example, in an encryption operation, such as Rivest Shamir Adleman (RSA), elliptic curve cryptography (ECC), or digital signature standard (DSS), an operation using the device private key (DEV-SK) may be performed by the protocol agent 120. Also, a signature (for example, RSA Sign) using a device private key (DEV-SK), which is performed for authenticating the device 10, may be conducted by the protocol agent 120.

The protocol manager 220 may generate a packet based on a defined protocol and communicate with an external device 20. For example, the protocol manager 220 may communicate with an external device 20 in accordance with an SSL or TLS protocol, and may perform encoding and decoding operations so as to generate a packet based on the SSL or TLS protocol. For example, when the device 10 transmits data to an external device 20, the protocol manager 220 may generate a packet including a result of the operation that is provided by the protocol agent 120, and transmit the generated packet to the external device 20. Also, when the device 10 receives data from an external device 20 and processing of the data is delegated to the protocol agent 120, the protocol manager 220 may provide the protocol agent 120 with data that is included in a packet.

According to the above-described configuration, the device 10 may safely issue a certificate without exposure of important information, such as the CA private key or the device private key, and may safely perform a security protocol. That is, in the process of issuing the certificate or in the process of performing communications based on the security protocol, a possibility of exposing of the private keys may be reduced, as compared to a case where the CA private key or the device private key is encrypted by software. According to the above-described configuration, since the device 10 uses the SE 100, the device 10 may safely perform the PKI communications even in an environment where the CA does not exist.

Figure 2:
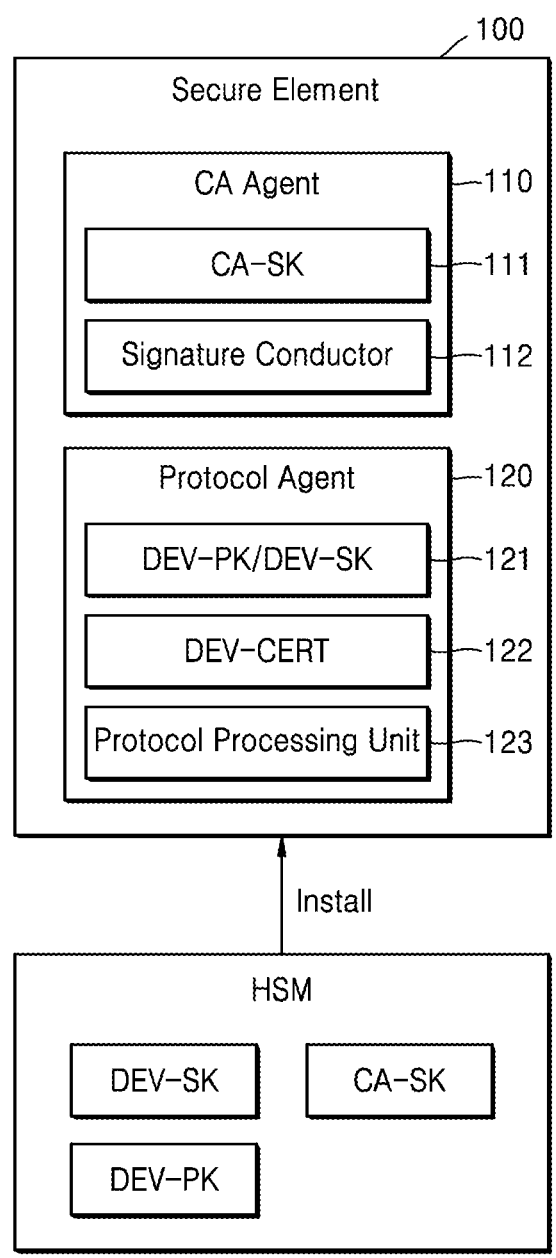
FIG. 2 is a block diagram of a secure element (SE) of FIG. 1, according to some example embodiments.

FIG. 2 is a block diagram of the SE 100 of FIG. 1, according to some example embodiments.

Referring to FIGS. 1 and 2, the SE 100 may include the CA agent 110 and the protocol agent 120. The CA agent 110 may include a certificate key storage 111 configured to store a CA private key (CA-SK), and a signature conductor 112 configured to apply and/or attach a digital signature on a certificate form. The protocol agent 120 may include a device key storage 121 configured to store a device public key (DEV-PK) and a device private key (DEV-SK), a certificate storage 122 configured to store a certificate, and a protocol processing unit 123 configured to perform various processing operations in relation to PKI communications.

In the process of manufacturing the SE 100, the CA private key (CA-SK), the device public key (DEV-PK), and the device private key (DEV-SK) may be installed on the SE 100 through a hardware security module (HSM). When the certificate form is received from the MCU 200 together with a request for a digital signature, the CA private key (CA-SK) may be provided to the signature conductor 112, and the signature conductor 112 may generate a digital signature encrypted by using the CA private key (CA-SK) and provide the digital signature to the MCU 200. Also, when a certificate including a digital signature is received from the MCU 200, the certificate may be stored in the certificate storage 122 of the SE 100.

As described above, the protocol processing unit 123 may perform various processing operations during the PKI communications based on the protocol such as SSL or TLS. For example, data that is transmitted and received during the communications using the protocol such as SSL or TLS may be encrypted or decrypted. The protocol processing unit 123 may include an encryption engine (not illustrated) configured to perform operations related to encryption and decryption, and may perform various encryption and decryption operations delegated by the MCU 200.

According to some example embodiments, an operation for generating the digital signature of the certificate or generating the signature using the device private key (DEV-SK) for authenticating the device 10 in a handshake process or a session process may be performed by the protocol processing unit 123. Also, an operation for decrypting encrypted data provided by an external device by using the device private key (DEV-SK) or performing a key agreement with an external device may be performed by the protocol processing unit 123.

According to some example embodiments, various processing operations during the PKI communications may be distributed to the SE 100 and the MCU 200. For example, the protocol processing unit 123 may further perform an operation using the device public key (DEV-PK), depending on the distributed state.

According to the embodiment of FIG. 2, the device 10 may perform the PKI communications without exposure of important information. In some example embodiments, if and/or when the key pair for the device 10 may be inserted in the process of manufacturing the SE 100, the relatively time-consuming process of generating the key pair may be excluded from being performed. Therefore, it is possible to reduce a booting delay that occurs when the device 10 is initialized.

Figure 3:
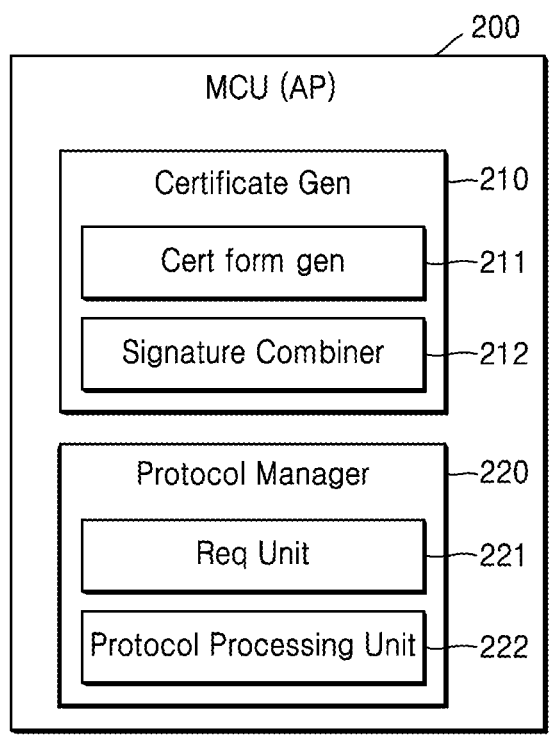
FIG. 3 is a block diagram of a microcontroller unit (MCU) of FIG. 1, according to some example embodiments.

FIG. 3 is a block diagram of the MCU 200 of FIG. 1, according to some example embodiments.

Referring to FIGS. 1 to 3, the MCU 200 may include the certificate generator 210 and the protocol manager 220. The certificate generator 210 may include a certificate form generator 211 and a signature combiner 212, and the protocol manager 220 may include a requesting unit 221 and a protocol processing unit 222.

The certificate generator 210 may generate a certificate form including a one or more instances of information and provide the certificate form to the SE 100. For example, the certificate generator 210 may request the SE 100 to send the device public key (DEV-PK) stored in the SE 100, generate a certificate including the device public key (DEV-PK), and provide the certificate form to the SE 100. The signature combiner 212 may generate a final certificate by combining the certificate form with the digital signature provided by the SE 100, and provide the final certificate to the SE 100.

The requesting unit 221 may request the SE 100 to perform at least one protocol processing that is performed during the PKI communications. For example, the requesting unit 221 may request the SE 100 to perform an operation using the device private key (DEV-SK) and receive a result of the operation from the SE 100. The protocol processing unit 222 may perform operations that are not delegated to the SE 100 from among a plurality of processing operations based on the protocol. In addition, the protocol processing unit 222 may generate a packet to be provided to an external device through a packet encoding process or a packet decoding process, or may extract information included in a packet provided by the external device.

Figure 4:
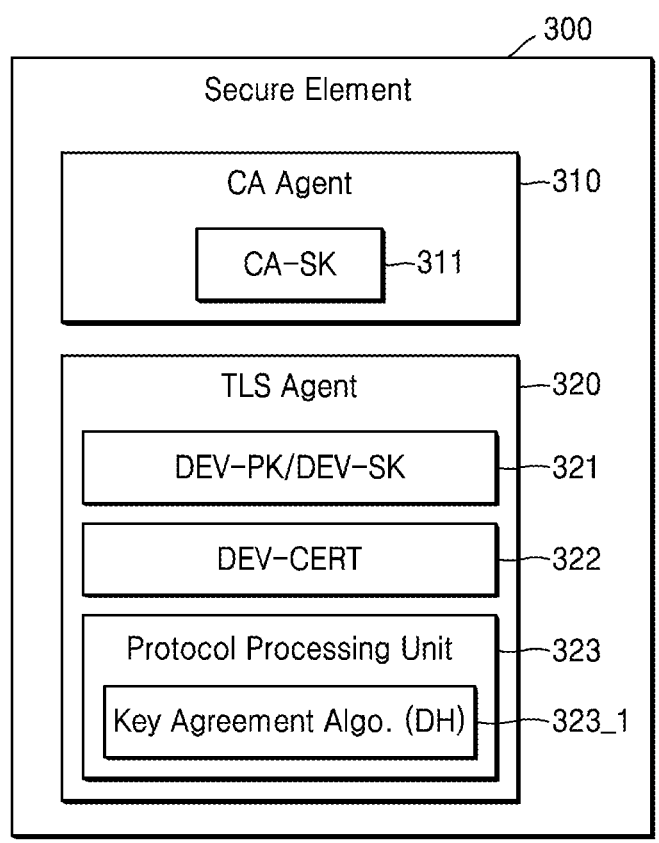
FIG. 4 is a block diagram of an SE included in a device using a transport layer security (TLS) protocol, according to some example embodiments.

FIG. 4 is a block diagram of an SE 300 included in a device using a TLS protocol, according to some example embodiments.

Referring to FIG. 4, the SE 300 may include a CA agent 310 and a TLS agent 320. The CA agent 310 may include a certificate key storage 311 configured to store a CA private key (CA-SK). Although not illustrated in FIG. 4, the CA agent 310 may further include a signature conductor (not illustrated) configured to apply/attach a digital signature.

The TLS agent 320 may perform various processing operations for communications based on the TLS protocol. The TLS agent 320 may include various components related to the communications based on the TLS protocol. The TLS agent 320 may include a device key storage 321 configured to store a device public key (DEV-PK) and a device private key (DEV-SK), a certificate storage 322 configured to store a certificate, and a protocol processing unit 323. The protocol processing unit 323 may include an algorithm execution unit 323_1 configured to execute an algorithm for a key agreement with an external device.

According to the TLS protocol, a handshake process and a session process may be performed between the device including the TLS agent 320 and an external client (or server) (e.g., external device 20). A session establishment and a key agreement process for generation of a symmetric key (or a session key) may be performed between the device and the external client (or server) during the handshake process. For example, in the TLS protocol, lots of time and resources are consumed for public key-based data encryption and decryption. Therefore, in the handshake process, the public key-based encryption and decryption may be performed during the communications of the handshake process. In the session process, data may be encrypted and decrypted by using the symmetric key generated in the handshake process.

As an example of a key agreement scheme for the generation of the symmetric key, an example in which the algorithm execution unit 323_1 executes a Diffie-Hellman (DH) key agreement algorithm is illustrated in FIG. 4. An operation using a private key, a secret key, and parameters may be performed through the DH key agreement algorithm, and a symmetric key for encrypting data to be transmitted between actual devices may be generated according to a result of the operation. In order to prevent the symmetric key from being exposed to the outside, the DH key agreement algorithm may be performed in the SE 300, instead of an MCU.

According to some example embodiments, data encryption and decryption operations using the symmetric key in the session process may be variously performed. For example, the symmetric key is information that is discarded after the session process is finished, and encryption and decryption operations using the symmetric key may be performed in the MCU. In some example embodiments, the algorithm execution unit 323_1 of the SE 300 may generate pre-symmetric key information related to the generation of the symmetric key and provide the generated pre-symmetric key information to the MCU. The MCU may generate the symmetric key through the operation using the pre-symmetric key information, and may perform the data encryption and decryption operations by using the symmetric key in the session process.

Figure 5:
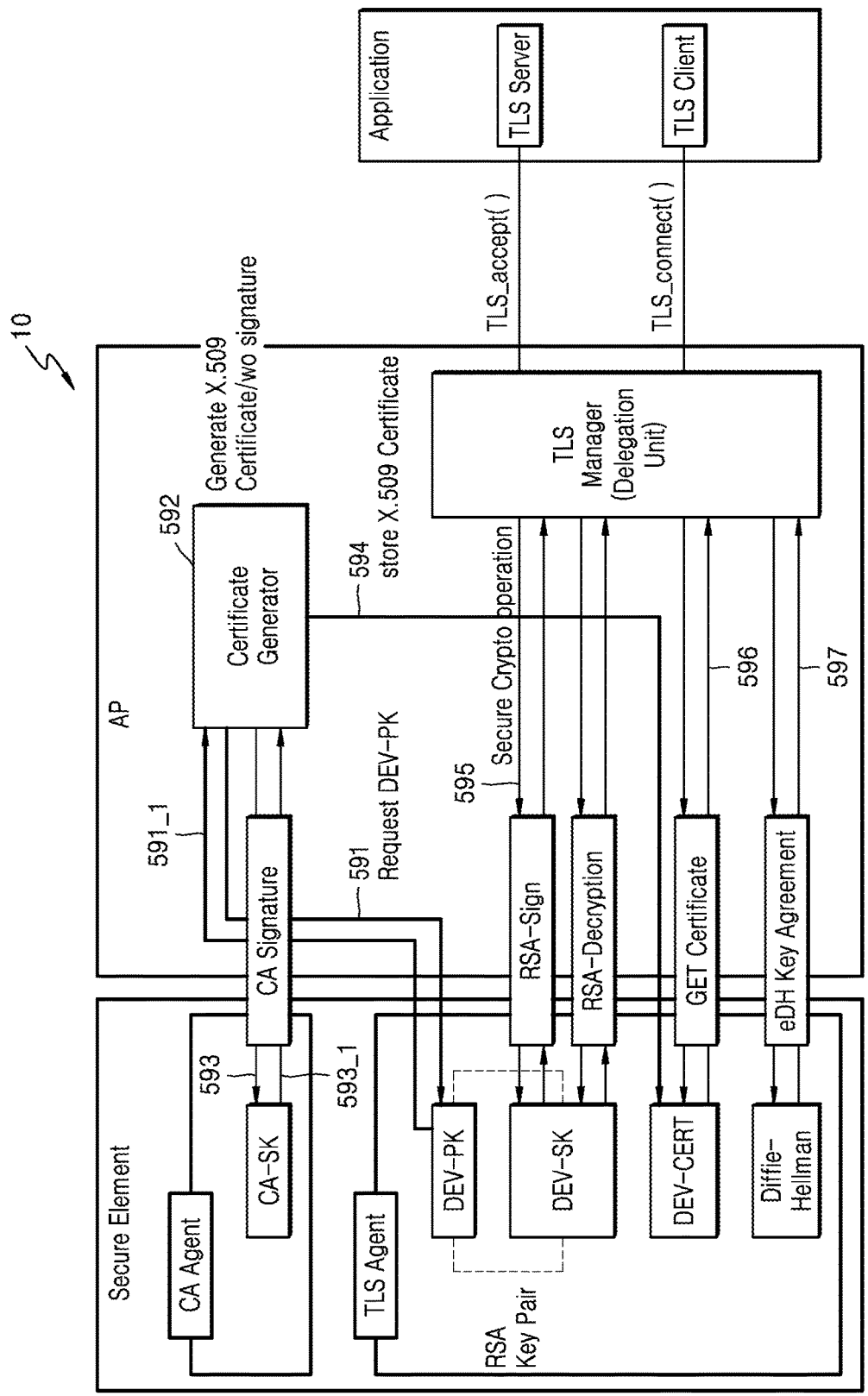
FIG. 5 is a block diagram for describing a process of performing public key infrastructure (PKI) communications in a device, according to some example embodiments.

FIG. 5 is a block diagram for describing a process of performing PKI communications in a device, according to some example embodiments. FIG. 5 illustrates the PKI communications based on the TLS protocol and an example in which an application utilizing security communications is executed. Also, in the following description, it is assumed that the MCU of the device is an AP.

The TLS may correspond to an encryption scheme of a transport layer of transmission control protocol/Internet protocol (TCP/IP) and may be applied to various protocols, such as hypertext transfer protocol (HTTP), network news transfer protocol (NNTP), file transfer protocol (FTP), and extensible messaging and presence protocol (XMPP). The device may operate as a TLS server or a TLS client through the application. It is assumed that an algorithm for a key agreement based on the TLS protocol is a DH key agreement algorithm. Also, it is assumed that a public key-based encryption operation is an RSA encryption operation. The protocol agent of the SE may be referred to as a TLS agent, and the protocol manager of the AP may be referred to as a TLS manager. As described above, the TLS manager delegates one or more processing operations based on the protocol to the SE. In this regard, the TLS manager may also be referred to as a protocol delegation unit.

According to the configuration illustrated in FIG. 5, the PKI communications may be performed in an environment where a CA does not exist, and a CA agent of the SE may serve to generate a CA digital signature on behalf of a CA server. For example, if and/or when an application is executed under control of the AP, the TLS manager (or the TLS delegation unit) and the application may communicate with each other through the handshake process, and operations based on the TLS protocol as illustrated in FIG. 5 may be performed. In some example embodiments, if and/or when the device 10 is initially driven, a mutual authentication process may be performed between the AP and the SE. Based on the mutual authentication succeeding, the operations based on the TLS protocol may be performed according to the procedure illustrated in FIG. 5.

At 591, the certificate generator of the AP generates a request to the SE to send a device public key (DEV-PK). At 591_1, the SE sends the requested device public key (DEV-PK) to the certificate generator of the AP. At 592 the certificate generator of the AP generates a certificate (e.g., X.509 certificate) form including the device public key (DEV-PK) received from the SE.

At 593, the certificate generator of the AP requests the CA agent of the SE to generate a digital signature for the certificate form. At 593_1, the certificate generator of the AP receives the digital signature generated at the CA agent, based on receipt of the request from the certificate generator at 593, using the CA private key (CA-SK) stored in the SE, and generates a final X.509 certificate signed based on a signature value generated by the CA agent. At 594, the certificate generator requests the SE to store the final X.509 certificate. The requesting at 594 may include transmitting the final X.509 certificate to the SE. According to some example embodiments, the X.509 certificate may be stored in the TLS agent of the SE.

The TLS manager of the AP may serve to generate a TLS message and a TLS session. At 595, the TLS manager may perform a handshake process and a session process with an external device, and the TLS manager requests the SE to perform important operations using the private key (e.g., device private key (DEV-SK)), which are performed in the handshake process and the session process. For example, the TLS manager may request the SE to perform a signature generation operation (RSA-Sign) and a decryption operation (RSA-Decryption) using the device private key (DEV-SK).

In the handshake process, he certificate including the signature may be provided to the external device, and the TLS manager may request the TLS agent to send the certificate. At 596, the TLS manager may receive the certificate from the SE and provide the received certificate to the external device. At 597 a process for a key agreement between devices may be performed in the handshake process, and the TLS manager may request the TLS agent to perform a key agreement algorithm (e.g., a DH key agreement algorithm).

An example in which the device performs the security operation based on the TLS protocol has been described above, but embodiments are not limited thereto. For example, the security chip may include an agent for digital rights management (DRM) and may be configured to perform security-related functions including data encryption and decryption when communications based on DRM are performed.

Figure 6:
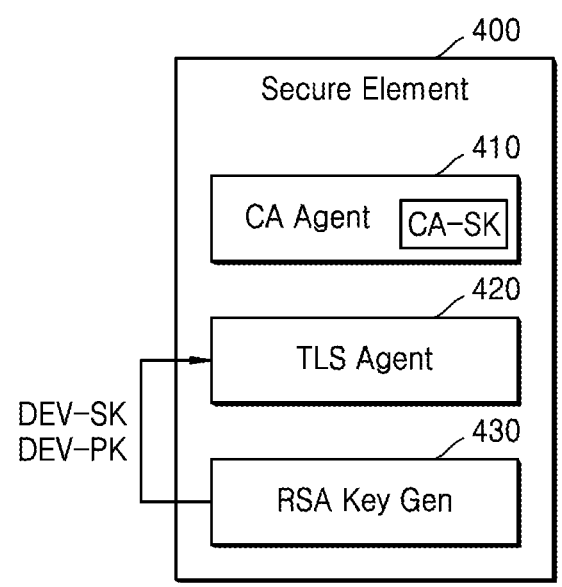
FIG. 6 is a block diagram of an SE according to some example embodiments.
Figure 7:
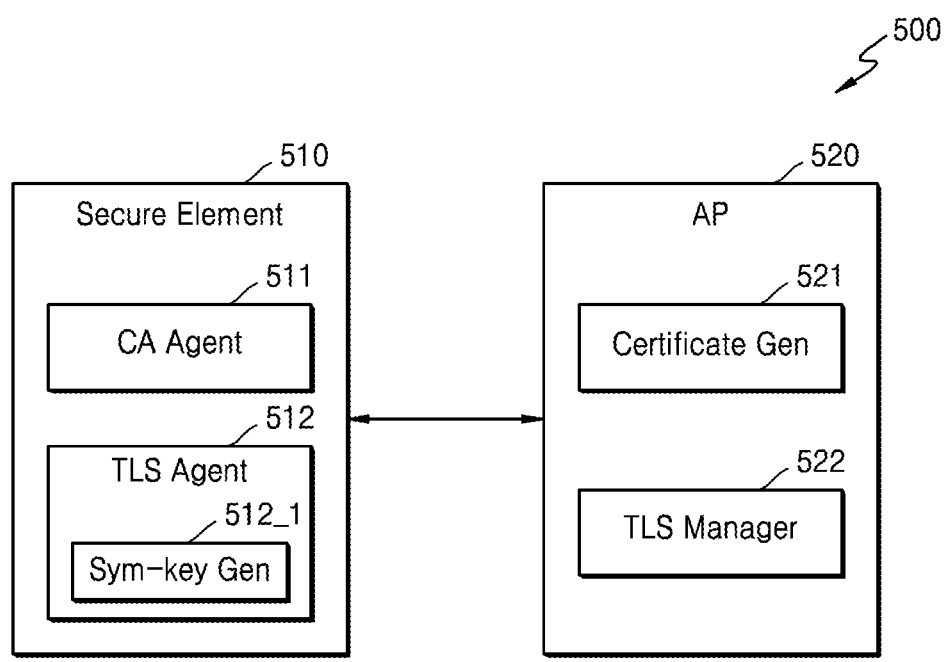
FIG. 7 is a block diagram of an SE and an application processor (AP), according to some example embodiments.

FIG. 6 is a block diagram of an SE 400 according to some example embodiments, and FIG. 7 is a block diagram of an SE 510 and an AP 520, according to some example embodiments.

Referring to FIG. 6, the SE 400 may include a CA agent 410, a TLS agent 420, and an RSA key generator 430. The CA agent 410 may store a CA private key (CA-SK) and may generate a digital signature by using the CA private key (CA-SK) according to a request from an AP (not illustrated). As described above, the TLS agent 420 may perform at least one selected from among processing operations during the PKI communications. For example, the TLS agent 420 may perform important encryption and decryption operations (e.g., RSA-Sign, RAS-Decryption, etc.) using the device private key (DEV-SK).

According to some example embodiments, the RSA key generator 430 of the SE 400 may generate an RSA key pair (e.g., a device public key (DEV-PK) and a device private key (DEV-SK)) for performing the PKI communications. That is, while the CA private key (CA-SK) is installed on the SE 400 by using an HSM in the process of manufacturing the SE 400, the RSA key pair may be generated in a software manner by the RSA key generator 430 when the SE 400 is initially driven. As the encryption operation scheme, the RSA scheme is illustrated in FIG. 6, embodiments may be applied to various encryption schemes (e.g., a public key-based encryption scheme).

Referring to FIG. 7, a device 500 may include an SE 510 and an AP 520. The SE 510 may include a CA agent 511 and a TLS agent 512. The AP 520 may include a certificate generator 521 and a TLS manager 522. The TLS agent 512 may include a symmetric key generator 512_1 configured to generate a symmetric key for encryption and decryption of actual data transmitted and received between devices in the session process.

As described above, when the device 500 performs communications based on the TLS protocol, the communications using the public key and the private key may be performed between devices in the handshake process, and a session key corresponding to the symmetric key may be generated. Also, the encryption and decryption of the data transmitted and received between the devices in the session process may be performed by the same session key.

According to some example embodiments, data encryption and decryption operations may be delegated to the SE 510 in the session process. In some example embodiments, the TLS agent 512 may generate pre-symmetric key information (e.g., pre-master secret) for generation of the session key through the DH key agreement algorithm or the like, and the symmetric key generator 512_1 may generate the session key corresponding to the symmetric key through the operation using the pre-symmetric key. In the session process, if and/or when encryption and decryption of data is performed, the TLS manager 522 may request the TLS agent 512 to perform the encryption and decryption operations, and the TLS agent 512 may encrypt and decrypt the data by using the session key.

According to another embodiment, only the operation for the generation of the session key may be delegated to the TLS agent 512, and the TLS agent 512 may provide the generated session key to the AP 520. That is, the encryption and decryption operations using the session key may be performed by the AP 520.

Figure 8:
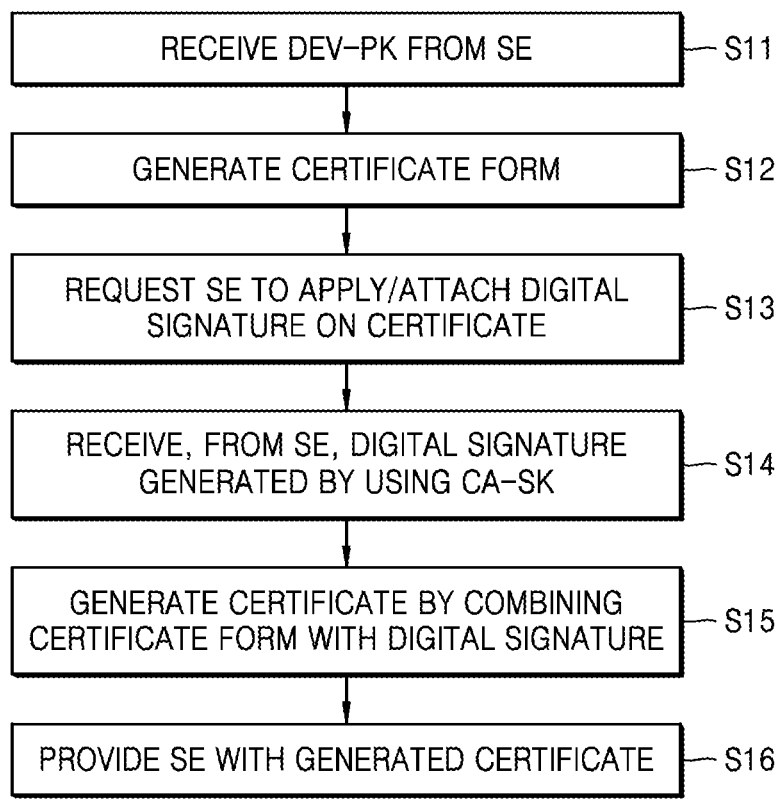
FIG. 8 and FIG. 9 are flowcharts of operating methods of a device, according to some example embodiments.
Figure 9:
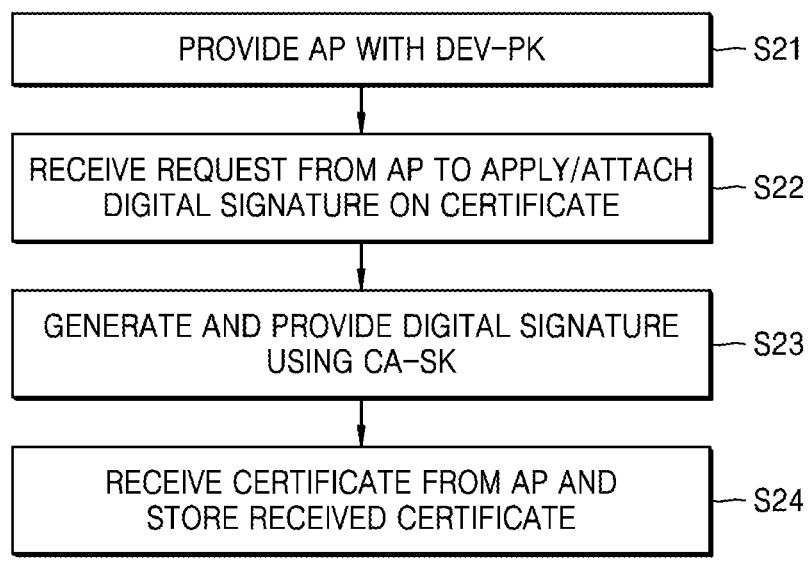

FIG. 8 and FIG. 9 are flowcharts of operating methods of a device, according to some example embodiments. An example of an operation of an AP in relation to certificate generation is illustrated in FIG. 8. An example of an operation of an SE in relation to certificate generation is illustrated in FIG. 9. The operating methods illustrated in FIGS. 8-9 may be implemented by one or more of the devices according to one or more example embodiments described herein.

Referring to FIG. 8, the AP may perform control to execute an application that performs security communications through a protocol such as TLS, and PKI communications may be performed by operations of a certificate generator and a protocol manager included in the AP In operation S11, the AP may request the SE to send a public key (e.g., a device public key (DEV-PK)) used for the PKI communications and may receive the public key from the SE.

In operation S12, the AP may generate a certificate form including the received public key. In operation S13, the AP may request the SE to apply/attach a digital signature on the certificate. In operation S14, the SE may generate the digital signature by using a CA private key (CA-SK), and the AP may receive, from the SE, the digital signature generated by using the CA private key (CA-SK). In operation S15, the AP may generate a final certificate by combining the certificate form with the digital signature. In operation S16, the AP may provide the SE with the final certificate and may request the SE to store the final certificate.

Hereinafter, an example of the operation of the SE will be described with reference to FIG. 9.

In operation S21, in order to generate the certificate, the SE may provide the AP with a device public key (DEV-PK) from among a plurality of keys installed in the process of manufacturing the SE. In operation S22, the SE may receive a request from the AP to apply/attach a digital signature on the certificate including the device public key (DEV-PK). In operation S23, the SE may generate a digital signature for the certificate by using the CA private key (CA-SK) stored in the SE and may provide the generated digital signature to the AP. In operation S24, when the AP generates the final certificate including the digital signature, the SE may receive the certificate from the AP and store the received certificate.

Figure 10:
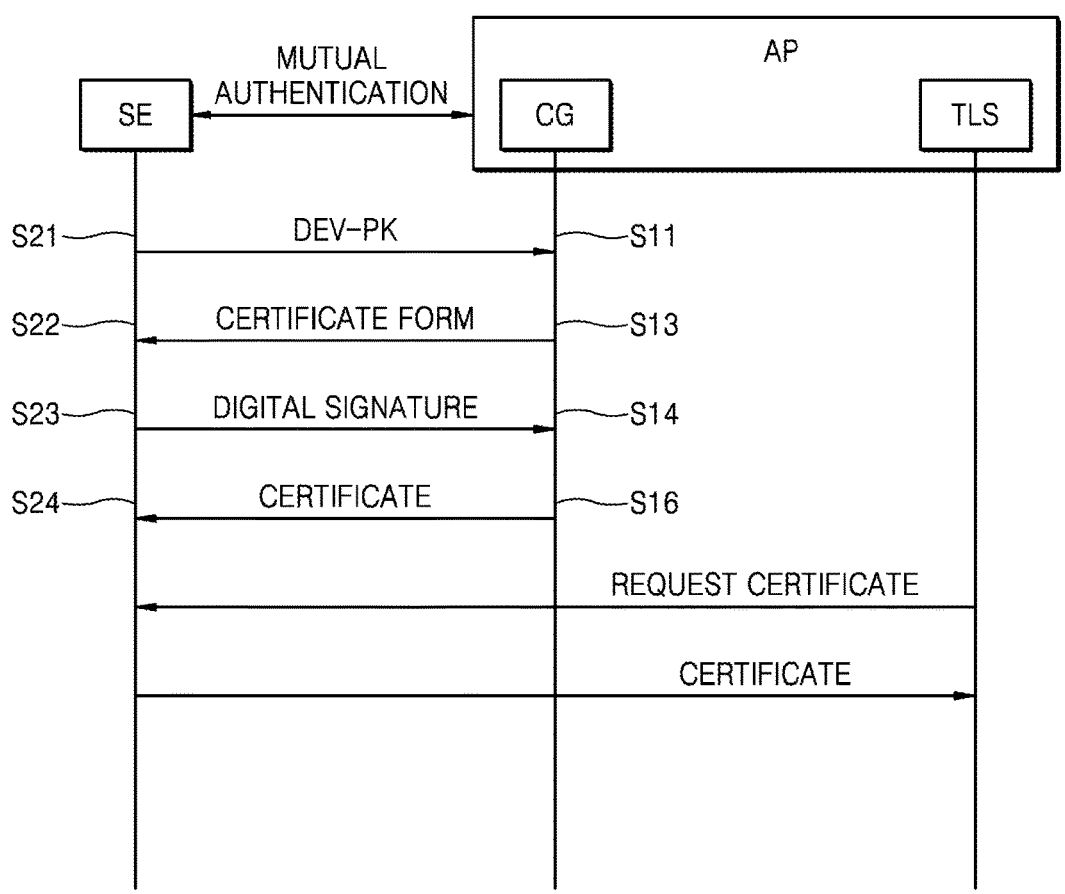
FIG. 10 is a flow diagram of a process of generating and using a certificate in the device in some example embodiments illustrated in FIGS. 8 and 9.

FIG. 10 is a flow diagram of a process of generating and using the certificate in a device in some example embodiments illustrated in FIGS. 8 and 9. Operations between the SE and the functional blocks of the AP are illustrated in FIG. 10.

A mutual authentication process may be performed between the SE and the AP. When a mutual authentication succeeds, communications may be performed between the SE and the AP.

In the generation and use of the certificate, the SE may transmit and receive a one or more instances of information to and from the certificate generator (CG) and the protocol manager (e.g., the TLS manager (TLS)). The SE may provide the device public key (DEV-PK) to the CG, and the CG provides the certificate form to the SE. The SE may provide the digital signature to the CG, and the CG may provide the final certificate form to the SE.

According to some example embodiments, when the device operates as a server, the device may provide the certificate including the device public key (DEV-PK) to an external client connected thereto. The TLS may request the SE to send the prestored certificate, and the SE may provide the certificate to the TLS. The TLS may provide the received certificate to the external client.

The operations related to the certificate generation may be performed when the device including the SE and the AP is initially driven. For example, whenever the device is booted, the mutual authentication process may be performed between the SE and the AP. After the mutual authentication succeeds, it may be determined whether a valid certificate has been stored in the AP or the SE. Operations related to the certificate generation may be performed according to a result of the determining.

FIG. 11, FIG. 12, FIG. 13, and FIG. 14 are flowcharts of operating methods of a device, according to some example embodiments. The operating methods illustrated in FIGS. 11-14 may be implemented by one or more of the devices according to one or more example embodiments described herein. FIGS. 11 to 14 illustrate examples in which PKI communications such as an RSA encryption scheme is performed in a handshake process (or a key exchange process), and data between a server and a client is encrypted and decrypted by using a session key corresponding to a symmetric key in a session process. In relation to the generation of the symmetric key, various algorithms may be applied to embodiments. For example, various algorithms, such as fiber channel 4 (FC4), data encryption standard (DES), triple DES (3DES), advanced encryption standard (AES), or Rivest cipher 4 (RC4), may be applied. However, this is merely an example. The device according to some example embodiments may perform a TLS protocol according to various schemes.

Figure 11:
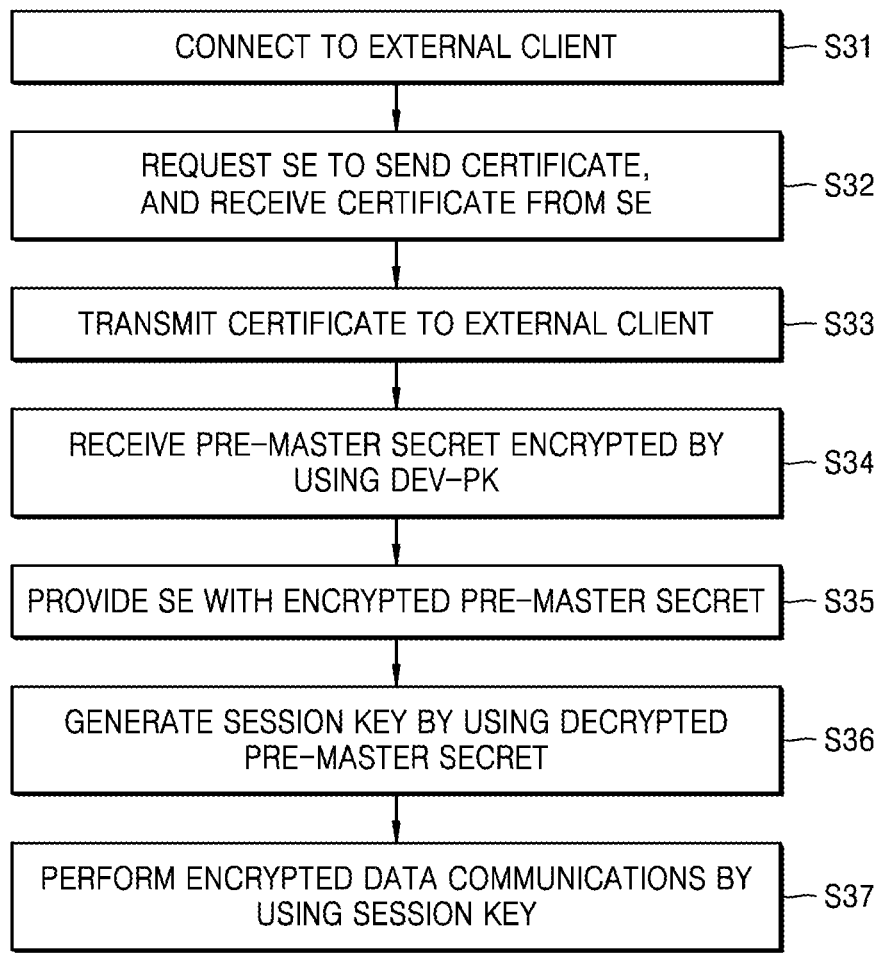
FIG. 11, FIG. 12, FIG. 13, and FIG. 14 are flowcharts of operating methods of a device, according to some example embodiments.

Referring to FIG. 11, a device (e.g., device 10) according to some example embodiments may operate as a server in the PKI communications. In operation S31, if and/or when the device is connected to an external client (e.g., external device 20), a handshake process may be performed for communications between the device and the external client.

In operation S32, if and/or when the device is connected to the external client, the AP may request an SE to send a certificate and may receive the certificate from the SE. In operation S33, the AP may transmit the certificate received from the SE to the external client.

In the handshake process, the client may generate random data and provide the generated random data to the device, and the device may generate random data and provide the device-generated random data to the external client. The random data generated by the device may be referred to as first random data, and the random data generated by the client may be referred to as second random data. The external client may generate pre-symmetric key information by using the first random data and the second random data. The pre-symmetric key information is preliminary information for generating the session key. According to the TLS protocol, the pre-symmetric key information may be referred to as a pre-master secret. The pre-master secret may be encrypted by using the device public key (DEV-PK) included in the certificate. In operation S34, the AP may receive the pre-master secret encrypted by using the device public key (DEV-PK). In operation S35, the AP may provide the encrypted pre-master secret to the SE.

The pre-master secret may be decrypted by using the device private key stored in the SE, and a session key may be generated by using the decrypted pre-master secret. According to some example embodiments, in operation S36, the AP may receive the decrypted pre-master secret from the SE, generate a master secret from the decrypted pre-master secret, and generate a session key by using the master secret. In operation S37, the AP may perform encrypted data communications with the external client by using the session key in the session process.

Figure 12:
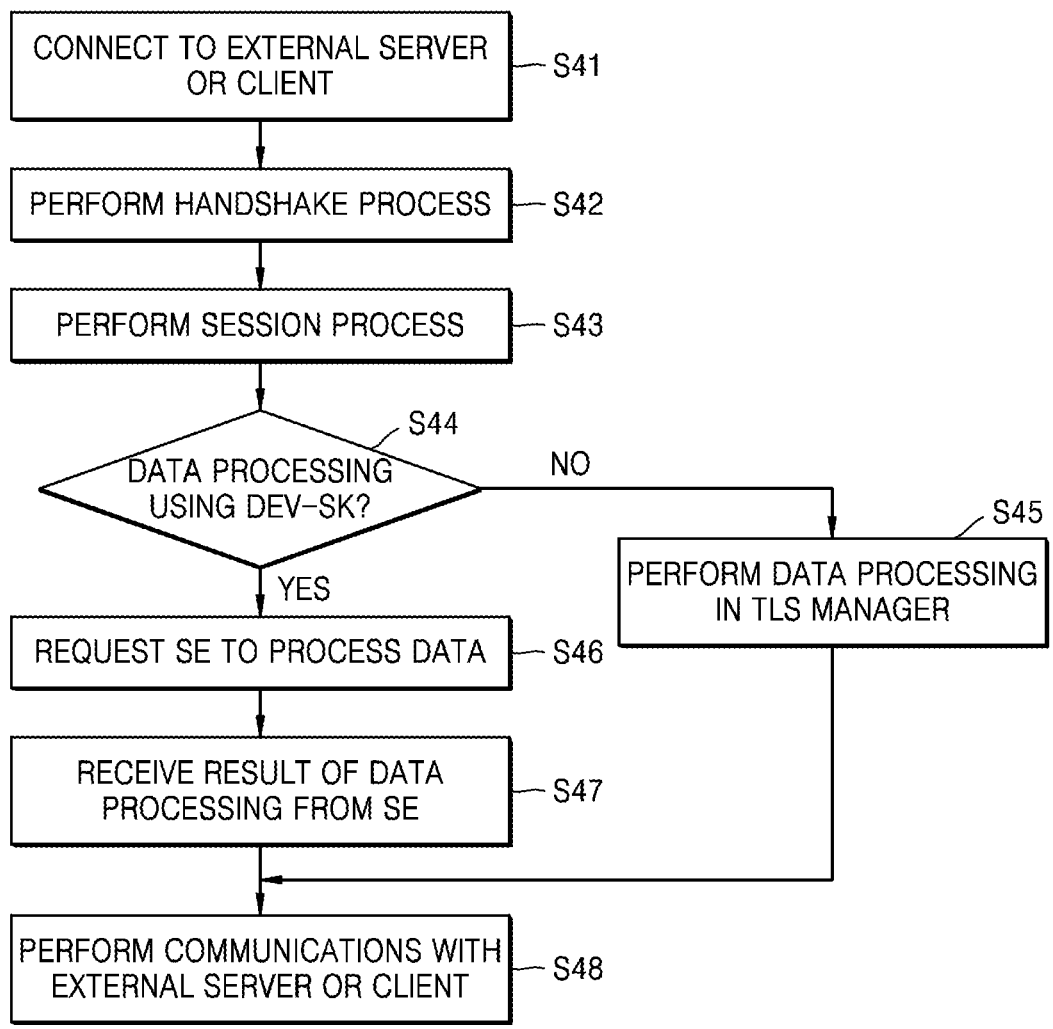

An example of an operation of an SE and an AP in a session process is illustrated in FIG. 12. Also, an example in which a device according to some example embodiments operates as a server or a client is illustrated in FIG. 12.

Referring to FIG. 12, in operation S41, the device may be connected to an external server or client. In operation S42, a handshake process between the device and the external server or client may be performed. The handshake process may include transmitting and receiving a certificate and generating a session key, at the device. In operation S43, when the handshake process is finished, a session process of transmitting and receiving data between the device and the external server or client may be performed.

In relation to the processing of the data, at least one selected from among a plurality of processing operations performed in the session process may be performed by the SE. For example, in operation S44, it may be determined whether a data processing operation to be performed by the device is performed by using a device private key (DEV-SK). In operation S45, when it is determined that the data processing operation is an operation having no relation to encryption and decryption or when it is determined that the data processing operation is performed by using a public key (e.g., device public key (DEV-PK)) or a session key (e.g., S44=NO), the data processing operation may be performed by the AP (e.g., the TLS manager). In operation S46, when it is determined that the data processing operation is an operation using the device private key (DEV-SK) (e.g., S44=YES), the AP may request the SE to process the data.

In operation S47, the SE may process the data by using the device private key (DEV-SK), and the AP may receive a result of the data processing from the SE. In operation S48, communications with the external server may be performed by using the data processed by the AP and the SE.

In the example embodiments illustrated in FIG. 12, the device private key (DEV-SK) is provided as a criteria of distributing various data processing operations to the AP and the SE, but embodiments are not limited thereto. As described above, the criteria of distributing the data processing operations may be variously set. For example, at least one selected from among the various operations of encrypting data by using the device public key (DEV-PK) may be further performed by the SE. In some example embodiments, the data encryption and decryption operations using the session key may be further performed by the SE.

Figure 13:
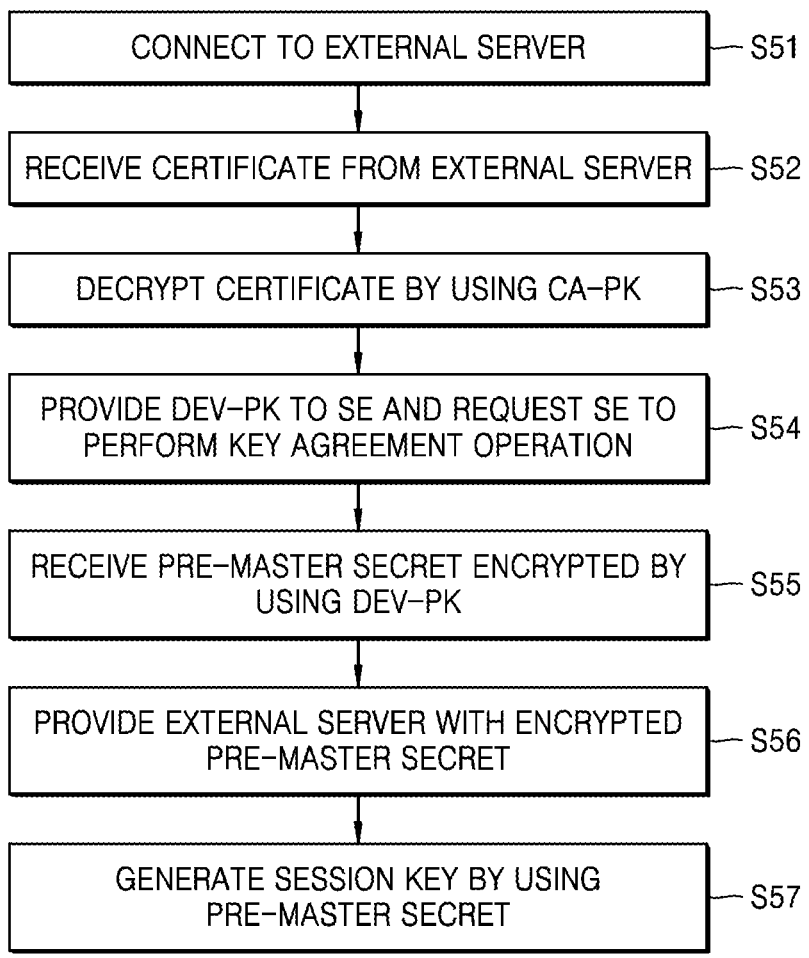

The device according to some example embodiments may operate as a client during the PKI communications. FIG. 13 illustrates an example of an operation of an AP when a device operates as a client.

In operation S51, when the device is connected to an external server (e.g., an external device 20), a handshake process may be performed between the device and the external server. In operation S52, in the handshake process, the device may receive a certificate including a server public key (or a device public key (DEV-PK)) from the external server. In operation S53, the AP may decrypt the received certificate by using a certificate public key (CA-PK). The server public key (DEV-PK) may be extracted from the certificate according to the decryption operation, and the AP may provide the server public key (DEV-PK) to an SE.

In operation S54, the device and the external server may perform cryptographic communications using a symmetric key, and the AP may request the SE to perform a key agreement operation so as to generate the symmetric key. The SE may generate a pre-master secret by using random data (first random data) previously generated by the SE and random data (second random data) provided by the external server, and the SE may encrypt the pre-master secret by using the server public key (DEV-PK).

In operation S55, the AP may receive the encrypted pre-master secret from the SE. In operation S56, the AP may provide the encrypted pre-master secret to the external server. In operation S57, the AP may receive the pre-master secret from the SE and generate a session key from the pre-master secret. The server also may generate the session key by using the encrypted pre-master secret. The device and the external server may share the same session key with each other through the above process, and a data encryption operation using the session key may be performed in a subsequent session process.

Figure 14:
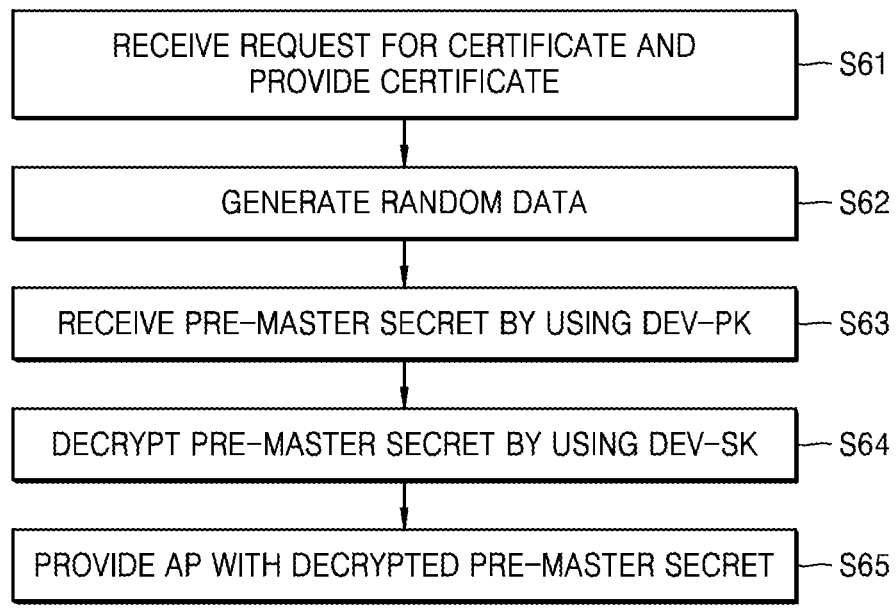

FIG. 14 illustrates an example of an operation of an SE in a device that performs PKI communications. An example in which the device operates as a server is illustrated in FIG. 14, but the operation of the SE when the device operates as a client may also be understood by referring to the above-described example embodiments.

Referring to FIG. 14, in operation S61, the SE may receive a request for a prestored certificate from the AP, and provide the certificate to the AP. In operation S62, the SE may generate random data (e.g., first random data) and provide the first random data to the AP. The AP may provide the certificate and the first random data to an external client.

The external client may generate a pre-master secret by using random data (e.g., second random data) generated by the external client itself and the first random data generated by the SE, and may encrypt the pre-master secret by using a device public key (DEV-PK) included in the certificate.

In operation S63, the SE may receive the pre-master secret encrypted by using the device public key (DEV-PK). In operation S64, the SE may decrypt the pre-master secret by using the device private key (DEV-SK) stored therein. In operation S65, the SE may provide the decrypted pre-master secret to the AP. The AP may generate a session key by using the decrypted pre-master secret. Subsequently, the AP may communicate with the external client through data encryption and decryption processing using the session key.

Figure 15:
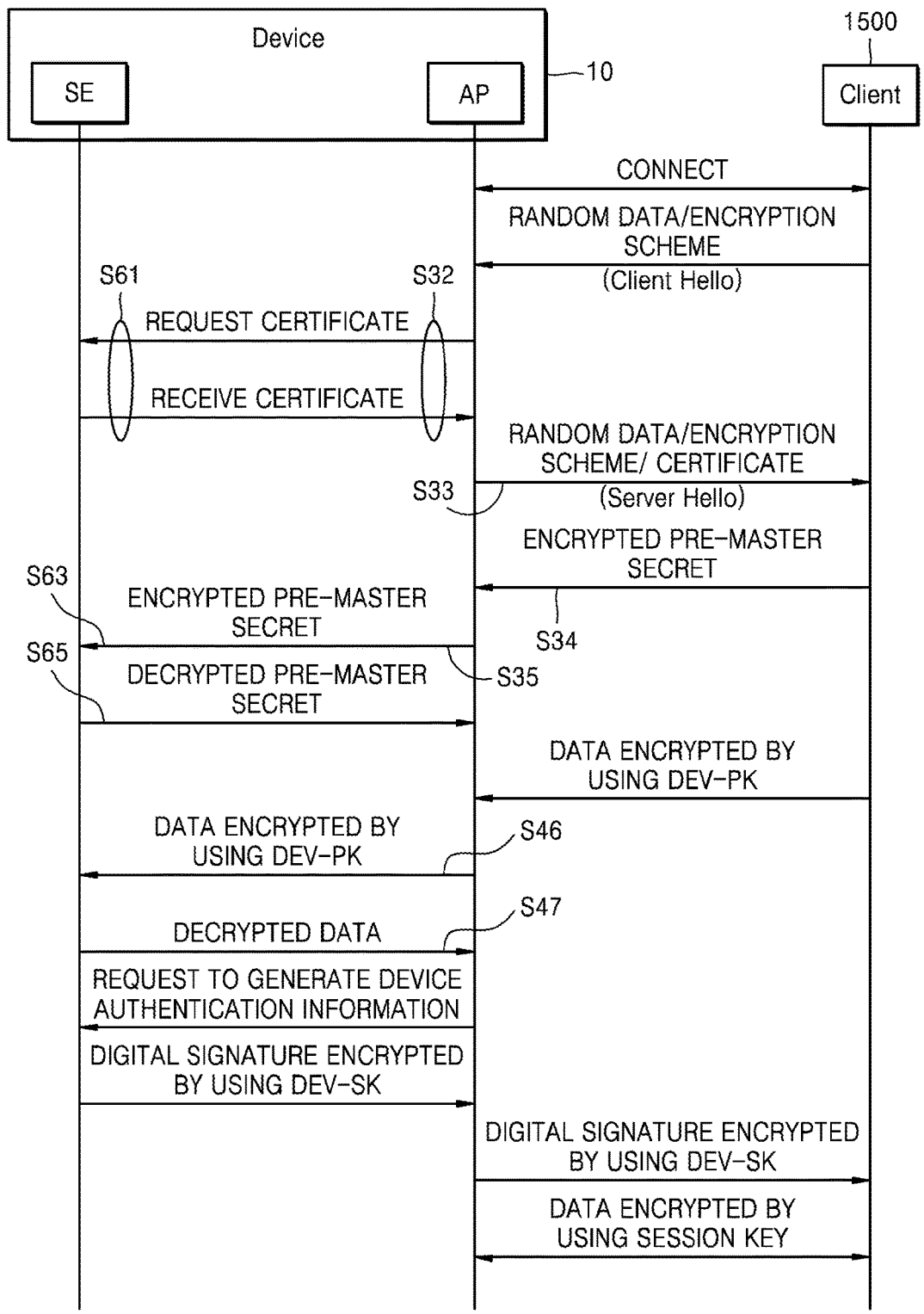
FIG. 15 is a diagram for describing a handshake process performed in the device in some example embodiments illustrated in FIGS. 11-14.

FIG. 15 is a diagram for describing the handshake process performed in the device according to the example embodiments illustrated in FIGS. 11 to 14. FIG. 15 illustrates operations between the AP and the SE of the device 10 and an external client 1500 when the device operates as a server. The external client 1500 may be external device 20. The AP and SE of device 10, as shown in FIG. 15 may be one of the example embodiments of an AP and SE described herein, respectively.

When the external client 1500 is connected to the device 10, a handshake process may be performed between the device 10 and the client 1500. As an example of the handshake process, the client 1500 may provide the AP of the device 10 with one or more instances of information, such as random data (e.g., first random data) and an encryption scheme supported by the client 1500, in a "client hello" process.

At S32 and S61, the AP of device 10 may request the SE of device 10 to send a prestored certificate to the AP, and the AP may receive the certificate from the SE. In a "server hello" process, at S33, the AP of device 10 may provide the client 1500 with the certificate together with one or more instances of information, such as random data (e.g., second random data) and an encryption scheme supported by the client 1500. The client 1500 may decrypt the certificate by using the CA public key (CA-SK), extract the device public key (DEV-PK) included in the certificate, and encrypt the pre-master secret by using the device public key (DEV-PK), the pre-master secret being generated by using the first random data and the second random data.

At S34, the AP may receive the encrypted pre-master secret and transmit the encrypted pre-master secret to the SE at S35 and S63. The SE may decrypt the pre-master secret by using the device private key (DEV-SK) and provide the decrypted pre-master secret to the AP at S65. The AP may generate a session key by using the decrypted pre-master secret.

In a subsequent session process, when data is encrypted or decrypted by using the session key, the AP may perform encryption or decryption processing by using the session key generated by the AP. In some example embodiments, if and/or when a processing operation using the device private key (DEV-SK) in the session process is performed, the corresponding processing operation may be delegated to the SE.

Figure 16:
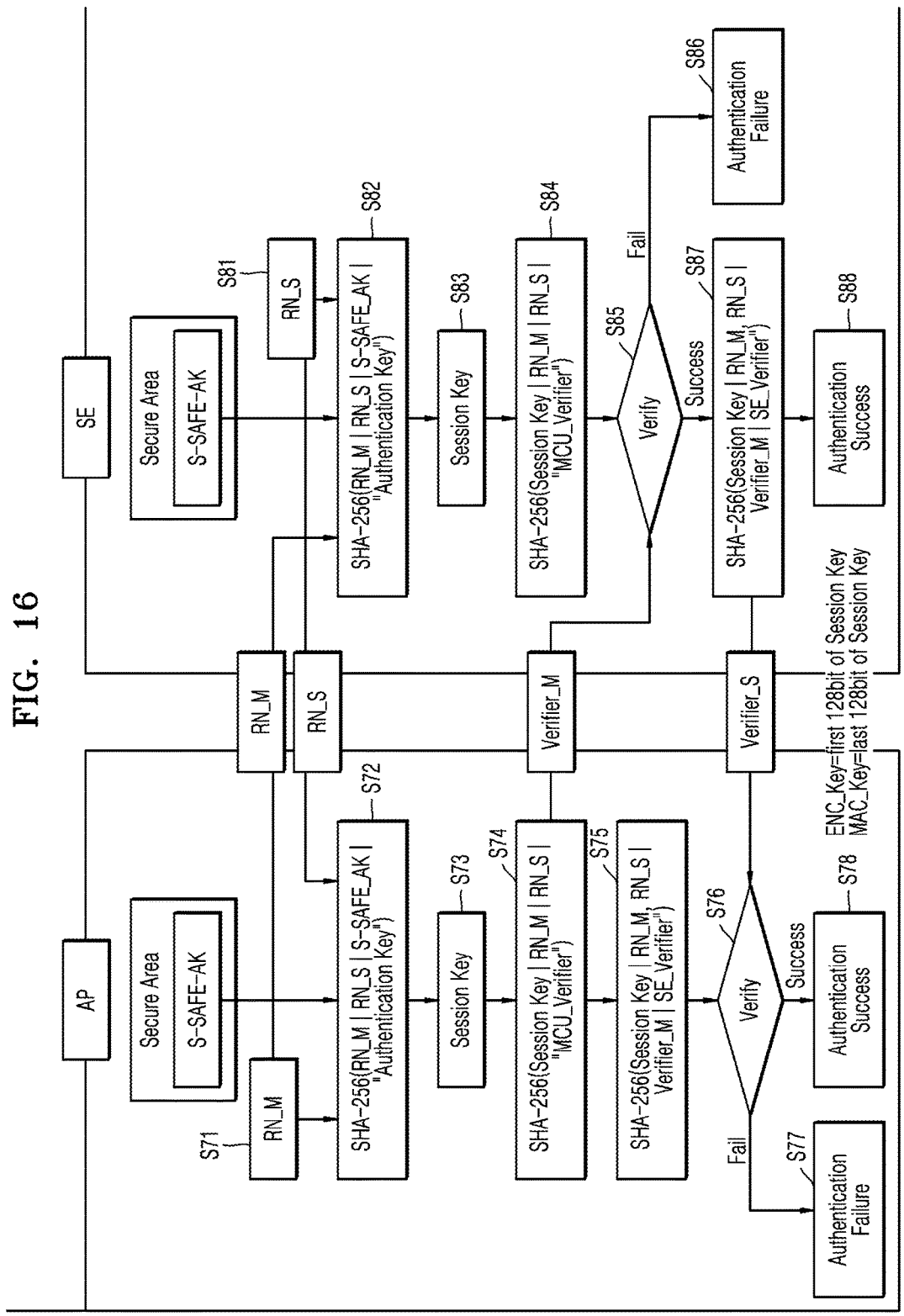
FIG. 16 is a flowchart of a mutual authentication process performed between an SE and an AP, according to some example embodiments.

FIG. 16 is a flowchart of a mutual authentication process performed between an SE and an AP, according to some example embodiments.

The SE and the AP may be separate semiconductor chips. Accordingly, the SE may be connected to various types of unreliable semiconductor chips. Therefore, in some example embodiments, the SE and the AP may perform a mutual authentication process so as to confirm whether the SE and the AP are mutually reliable objects. For example, the mutual authentication process may be performed whenever a device including the SE and the AP is booted.

Each of the SE and the AP may have a secure area designed to prevent information from being exposed to the outside. Various setting values including a previously shared authentication key (S-SAFE-AK) may be stored in the secure areas of the SE and the AP. According to some example embodiments, the authentication keys (S-SAFE-AK) stored in the secure areas of the SE and the AP may have the same value.

Referring to FIG. 16, in operation S71, the AP may generate a first random number (RN_M) through a random number generator, and provide the first random number (RN_M) to the SE. In operation S81, the SE may generate a second random number (RN_S) through a random number generator, and provide the second random number (RN_S) to the AP.

Data communications between the AP and the SE may be performed by using a symmetric key (e.g., a session key). Each of the AP and the SE may generate a session key by using a certain key generation algorithm. As an example of the key generation algorithm, a secure hash algorithm-256 (SHA-256) based key generation algorithm as a hash algorithm is illustrated in FIG. 16, but other various key generation algorithms may be applied to embodiments.

In operation S72, the AP may execute a hash algorithm using the first random number (RN_M), the second random number (RN_S), an authentication key, and a first string value (authentication key). In operation S73, the AP may generate a session key according to a result of executing the hash algorithm. Similarly, in operation S82, the SE may execute a hash algorithm using the first random number (RN_M), the second random number (RN_S), the authentication key, and the first string value (authentication key). In operation S83, the SE may generate a session key according to a result of executing the hash algorithm.

Subsequently, the session keys generated by the AP and the SE may be verified. For example, in operation S74, the AP may execute a hash algorithm using the session key, the first random number (RN_M), the second random number (RN_S), and a second string value (MCU_Verifier), and the AP may provide the SE with a first result value (Verifier_M) obtained by the execution of the hash algorithm. In operation S84, the SE may execute a hash algorithm using the session key, the first random number (RN_M), the second random number (RN_S), and the second string value (MCU_Verifier). In operation S85, the SE may perform a first verification operation by using a result of the SE's executing the hash algorithm and the first result value (Verifier_M) received from the AP. In operation S86, when the verification fails in the first verification operation, it may be determined as authentication failure.

When the verification succeeds in the first verification operation, the SE may certificate that the AP has generated a correct session key. In operation S77, the SE may execute a hash algorithm using the session key, the first random number (RN_M), the second random number (RN_S), the first result value (Verifier_M), and a third string value (SE_Verifier), and the SE may provide the AP with a second result value (Verifier_S) obtained by the execution of the hash algorithm.

In operation S75, the AP may execute a hash algorithm using the session key, the first random number (RN_M), the second random number (RN_S), the first result value (Verifier_M), and the third string value (SE_Verifier). In operation S76, the AP may perform a second verification operation by using a result of the AP's executing the hash algorithm and the second result value (Verifier_S) received from the SE. In operation S77, when the verification fails in the second verification operation, it may be determined as authentication failure. When the verification succeeds in the second verification operation, the AP may certificate that the SE has generated a correct session key. Accordingly, in operations S78 and S88, the mutual authentication of the SE and the AP may finally succeed.

When the mutual authentication of the SE and the AP succeeds, the generated session key may be variously used in relation to the symmetric key encryption operation. According to some example embodiments, a part of the session key (e.g., upper 128 bits) may be used as a symmetric key (ENC_Key), and another part of the session key (e.g., lower 128 bits) may be used as a MAC key (MAC_Key). Therefore, the SE and the AP may communicate with each other by using symmetric key (ENC_Key) encryption, and may generate the MAC by using the MAC key (MAC_Key) related to the generation of the MAC.

FIGS. 17A-D are block diagrams illustrating examples of assigning a MAC to a one or more instances of information in devices 600A to 600D, according to some example embodiments. For convenience of description, the various detailed components illustrated in some example embodiments described above are not illustrated in the devices 600A to 600D of FIGS. 17A to 17D.

Figure 17A:
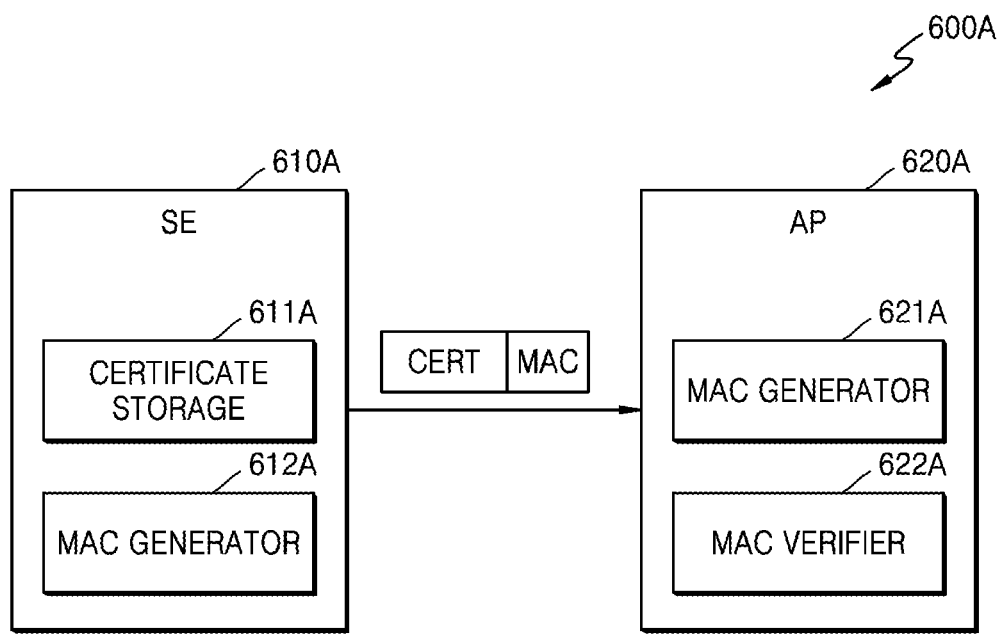
FIGS. 17A-D are block diagrams illustrating examples of assigning a message authentication code (MAC) to a one or more instances of information in a device, according to some example embodiments.

Referring to FIG. 17A, the device 600A may include an SE 610A and an AP 620A. The SE 610A may include a certificate storage 611A and a MAC generator 612A. The AP 620A may include a MAC generator 621A and a MAC verifier 622A.

The SE 610A and the AP 620A may generate a symmetric key and communicate with each other by using the symmetric key through the mutual authentication process as described above. According to some example embodiments, a MAC may be added to information transmitted and received between the SE 610A and the AP 620A, so as to verify integrity of the information transmitted and received therebetween. Various algorithms may be used to generate the MAC. For example, SHA, SHA-256, and SHA-384 algorithms or a message-digest algorithm 5 (MD5), may be used.

According to the embodiment illustrated in FIG. 17A, the MAC generator 612A of the SE 610A may generate a MAC with respect to a certificate (CERT) to be provided to the AP 620A. In the AP 620A, the MAC generator 621A may generate a MAC with respect to the certificate received from the SE 610A, and the MAC verifier 622A may verify integrity of the certificate by comparing the MAC provided by the SE 610A with the MAC generated by the AP 620A.

Figure 17B:
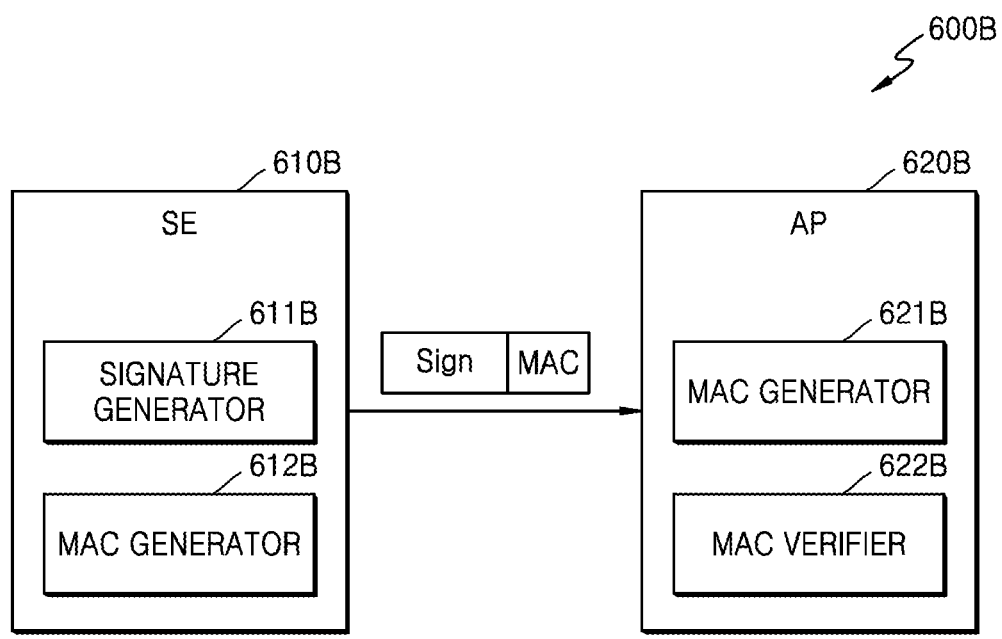

FIG. 17B illustrates an example of verifying integrity of a signature (e.g., RSA Sign, etc.) provided from an SE 610B to an AP 620B. Referring to FIG. 17B, the device 600B may include the SE 610B and the AP 620B. The SE 610B may include a signature storage 611B and a MAC generator 612B. The AP 620B may include a MAC generator 621B and a MAC verifier 622B.

The signature generator 611B may generate a signature (Sign) to be used to authenticate the device 600B, by using a device private key provided in the SE 610B. The MAC generator 612B may generate a MAC with respect to the signature (Sign) generated by the signature generator 611B. The signature (Sign), to which the MAC is added, may be provided to the AP 620B, and the AP 620B may verify the integrity of the signature (Sign). The signature (Sign), the integrity of which is verified, may be provided to an external device.

Figure 17C:
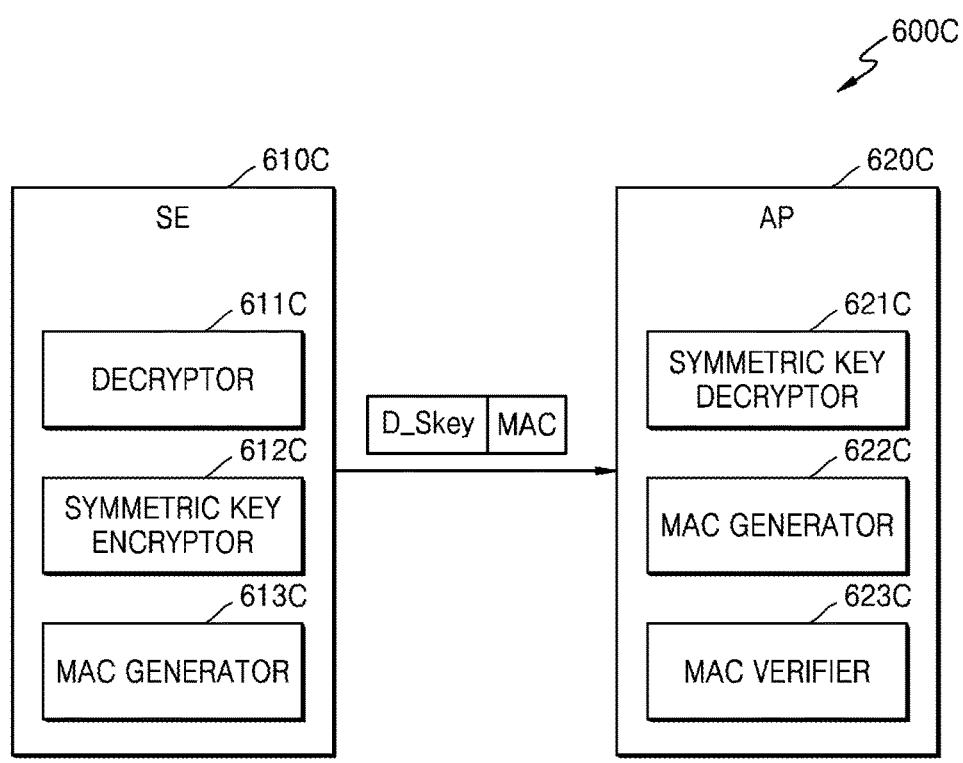

FIG. 17C illustrates an example of adding a MAC to data decrypted by an SE 610C when the decrypted data (D-Skey) is provided to an AP 620C. Referring to FIG. 17C, the device 600C may include the SE 610C and the AP 620C. The SE 610C may include a decryptor 611C, a symmetric key encryptor 612C, and a MAC generator 613C. The AP 620C may include a symmetric key decryptor 621C, a MAC generator 622C, and a MAC verifier 623C.

Public key-based encrypted data may be provided from an external device (e.g., a client) to the device 600C, and the encrypted data may be provided to the decryptor 611C. The decryptor 611C decrypts the encrypted data by using a device private key.

The decrypted data (D-Skey) may be provided from the SE 610C to the AP 620C. The symmetric key encryptor 612C may encrypt the decrypted data (D-Skey) by using a symmetric key generated in a mutual authentication process performed between the SE 610C and the AP 620C. At this time, a MAC may be added to the decrypted data (D-Skey).

The symmetric key decryptor 621C of the AP 620C may decrypt the data encrypted by using the symmetric key. The MAC generator 622C may generate a MAC corresponding to the decrypted data (D-Skey). The MAC verifier 623C may verify the integrity of the decrypted data (D-Skey).

Figure 17D:
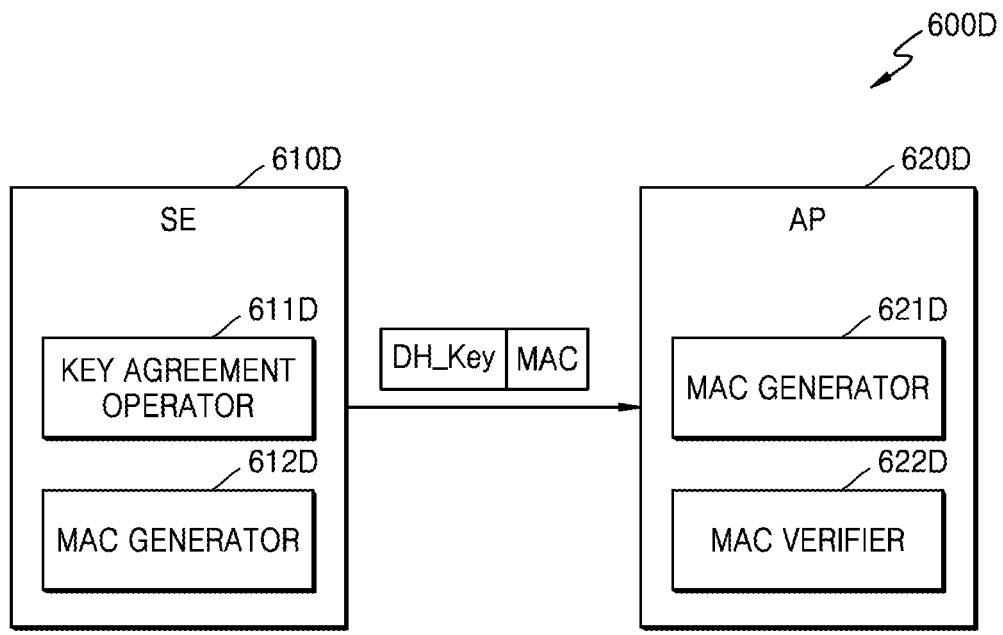

FIG. 17D illustrates an example of using a MAC in a key agreement process performed between the device 600D and an external device (e.g., a server or a client). As a key agreement algorithm, a DH key agreement algorithm is used herein. Referring to FIG. 17D, the device 600D may include an SE 610D and an AP 620D. The SE 610D may include a key agreement operator 611D and a MAC generator 612D. The AP 620D may include a MAC generator 621D and a MAC verifier 622D.

In a handshake process performed between the device 600D and the external device, a key agreement process is performed so as to generate a symmetric key to be used to encrypt and decrypt actual data. The key agreement operator 611D may perform various operations related to generation of a session key through the key agreement process. For example, in the key agreement process, key agreement information related to the generation of the session key (e.g., parameters, random data, pre-master secret, etc.) may be provided from the SE 610D to the AP 620D. A MAC may be added to the key agreement information. The AP 620D may verify integrity of the received key agreement information.

The SEs 610A to 610D and the APs 620A to 620D, which are respectively illustrated in FIGS. 17A to 17D, may perform symmetric key encryption communications or generate the MAC by using the session key generated in the mutual authentication process illustrated in FIG. 16. The MAC generation function of the SE may be performed by the protocol processing unit of the SE. The MAC generation and verification function of the AP may be performed by the protocol processing unit of the AP.

Figure 18:
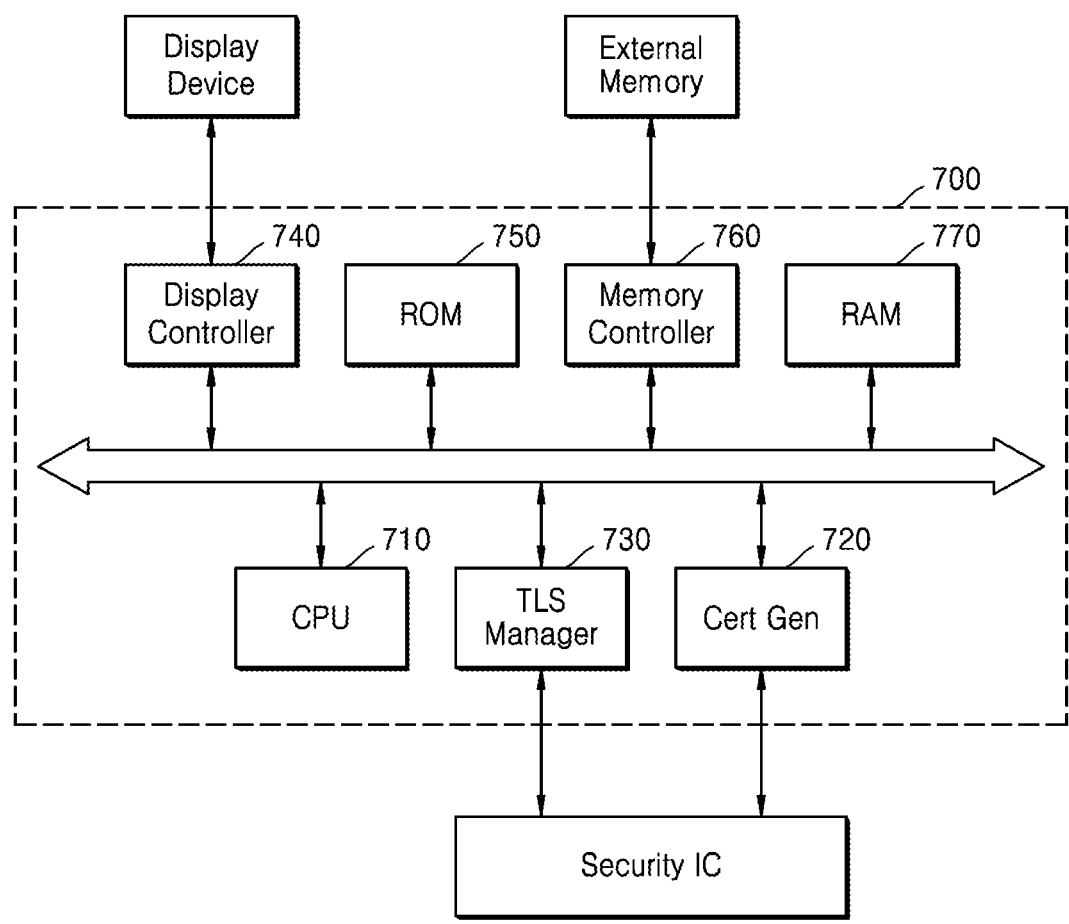
FIG. 18 is a block diagram of an AP according to some example embodiments.

FIG. 18 is a block diagram of an AP 700 according to some example embodiments.

Referring to FIG. 18, the AP 700 may be an SoC. The AP 700 may be mounted on the devices according to the embodiments described above and may control overall operations of the devices. Referring to FIG. 18, the AP 700 may include a central processing unit (CPU) 710, a certificate generator 720, a TLS manager 730, a display controller 740, a read-only memory (ROM) 750, a memory controller 760, and a random access memory (RAM) 770. The AP 700 may further include other components, for example, a power management unit (not illustrated), a graphics processing unit (GPU) (not illustrated), and a clock unit (not illustrated).

The CPU 710, also referred to herein as a processor, may process or execute programs or data stored in the ROM 750 and/or the RAM 770. For example, the CPU 710 may process or execute the programs or the data according to an operating clock. The CPU 710 may be a multi-core processor. The multi-core processor is a single computing component including two or more independent processors (e.g., cores). Each of the processors may read and execute program instructions.

The ROM 750 may store the programs and/or the data in a non-volatile manner Such programs and/or data may be referred to herein as computer readable instructions. The CPU 710 ("processor") may execute one or more instances of computer readable instructions to implement some or all of the example embodiments of the AP described herein. The ROM 750 may be erasable programmable read-only memory (EPROM) or electrically erasable programmable read-only memory (EEPROM). The RAM 770 may temporarily store the programs, the data, and the program instructions. For example, the programs and/or the data stored in the ROM 750 may be temporally stored in the RAM 770 under control of the CPU 710. The RAM 770 may be a memory such as dynamic RAM (DRAM) or static RAM (SRAM).

The memory controller 760 performs interfacing with an external memory device and writes or reads data by controlling the external memory device according to a data access request. The display controller 740 may drive a display device and control a screen display operation of the display device.

According to some example embodiments, the AP 700 may communicate with an SE (or a security integrated circuit (IC)) that may be a separate external semiconductor chip. When the AP 700 is initially driven, a mutual authentication process may be performed between the AP 700 and the SE, as described above. According to some example embodiments, when the mutual authentication succeeds, the AP 700 and the SE may perform encryption communications using a symmetric key or the like.

As described above, the certificate generator 720 and the TLS manager 730 included in the AP 700 may perform various operations for PKI communications. For example, the AP 700 may request the SE to perform at least one selected from among a plurality of functions related to the PKI communications. As described above, important operations may be performed by the SE. Examples of the important operations may include the digital signature for the certificate or the device public key, related information of which is utilized not to be exposed to the outside.

Figure 19:
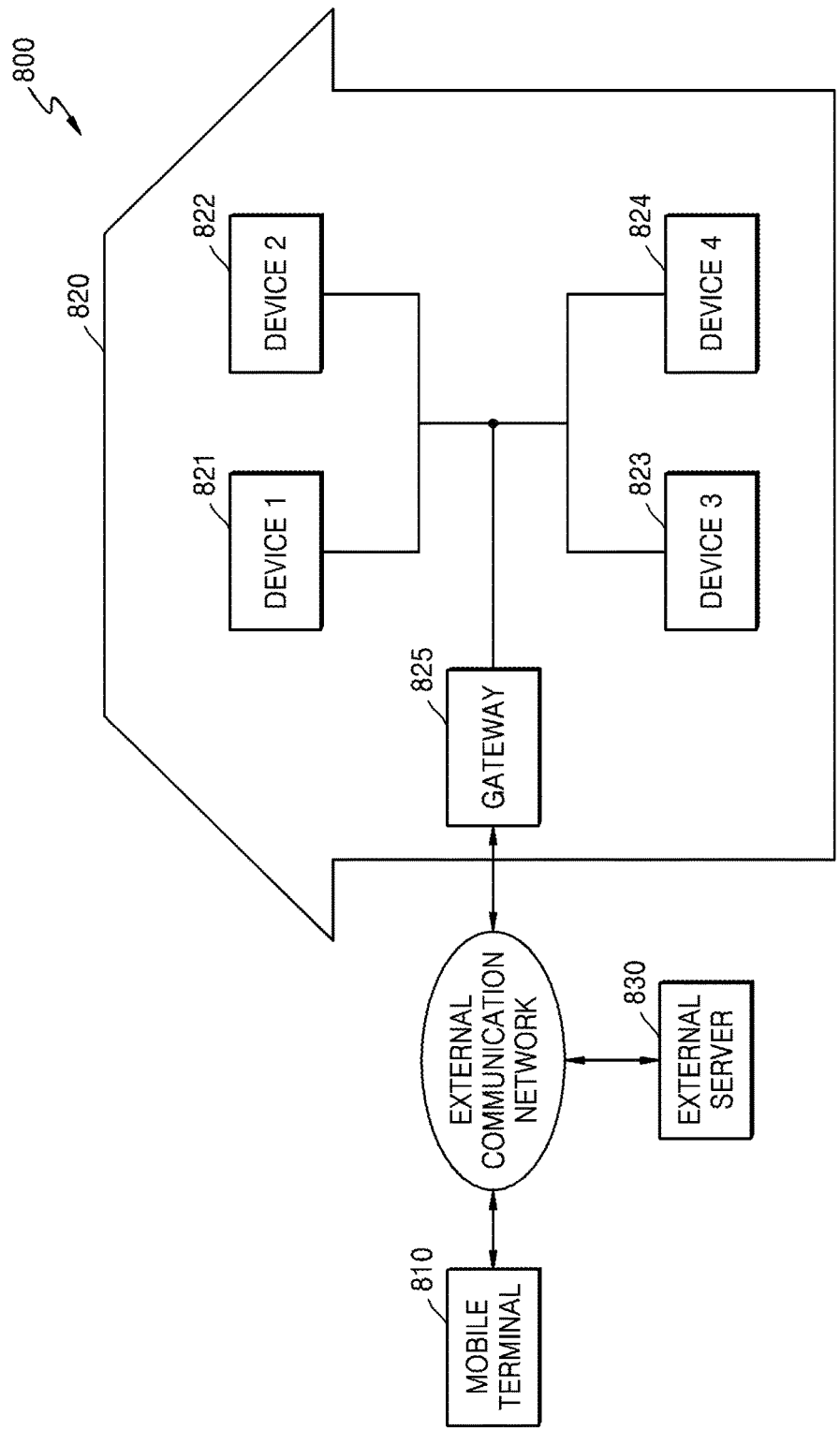
FIG. 19 is a block diagram of a smart home system including a device, according to some example embodiments.

FIG. 19 is a block diagram of a smart home system 800 according an embodiment.

Referring to FIG. 19, a plurality of devices 821 to 824 provided in the smart home system 800 may be connected to an external server 830 via a gateway 825 and an external communication network. A mobile terminal 810 also may be connected to the external server 830 via the external communication network. The plurality of devices 821 to 824 may be household appliances used at a smart home, such as a refrigerator, an air conditioner, a washing machine, and a cleaner. Information about conditions or fault diagnosis of the plurality of devices 821 to 824 may be provided to the external server 830. The external server 830 receives information about the devices 821 to 824 and provides a smart management service with respect to the devices 821 to 824.

A user of the mobile terminal 810 may access the devices 821 to 824 via the external communication network and the gateway 825. The user of the mobile terminal 810 may access the external server 830 via the external communication network and check the conditions of the devices 821 to 824. In the smart home system 800, the PKI communications according to the embodiments above described may be performed even in an environment where the CA does not exist, thereby securing security of information transmitted and received via the external communication network.

In some example embodiments, one or more of the devices 821 to 824 may include one or more of the devices 10, 600A-D described herein. That is, each of the devices 821 to 824, the external server 830, and the mobile terminal 810, which are related to the smart home system 800, may include the AP and the SE according to the embodiments described above, and may perform communications based on the security protocol such as TLS. Besides the smart home system, although not illustrated in FIG. 19, the AP and the SE according to the embodiments may be applied to main components of a smart car. That is, a one or more instances of information of the smart car, such as a route search and a fault diagnosis, may be provided to the external server while securing the security of the information, and the external server may manage the smart car by using the safely received information.

According to the security chip, the application processor, the device including the security chip, and the operating method of the security chip, as set forth above, the PKI communications may be safely performed without exposure of the CA private key or the like even in an environment where the CA does not exist, and the costs for building a system may be reduced.

In addition, according to the security chip, the application processor, the device including the security chip, and the operating method of the security chip, the operation using relatively important information may be delegated to the security chip via the security protocol including the handshake process and the session process, thereby strengthening the security of the PKI communications.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An operating method of a security chip, the operating method comprising:
    performing, at the security chip,
        transmitting, to an application processor (AP), a device public key of a device key pair, the device key pair associated with public key infrastructure communications;
        receiving a request, from the AP, to generate a digital signature on a certificate form, the certificate form including the device public key;
        generating the digital signature, based on the received request to generate the digital signature, the digital signature generated based on an encryption operation using a certificate authority (CA) private key;
        transmitting the digital signature to the AP;
        receiving a certificate from the AP, the certificate including the digital signature; and
    storing the certificate at the security chip.

2. The operating method of claim 1, wherein
    the security chip is a semiconductor chip,
    the security chip and the AP are included in a common device; and
    the semiconductor chip is separate from the AP.

3. The operating method of claim 1, further comprising:
    performing, at the security chip,
        performing mutual authentication with the AP;
        generating a symmetric key associated with communication between the security chip and the AP;

encrypting data transmitted to the AP according to the generated symmetric key; and decrypting data received from the AP according to the generated symmetric key.

4. The operating method of claim 1, wherein, the device public key, a device private key, and the CA private key are installed at the security chip through a hardware security module in a process of manufacturing the security chip.

5. The operating method of claim 1, further comprising:
performing, at the security chip,
transmitting the certificate, based on receiving a request for the certificate to be transmitted to an external client;
receiving pre-symmetric key information, the pre-symmetric key information generated by the external client and encrypted according to the device public key; and
decrypting the pre-symmetric key information according to a device private key.

6. The operating method of claim 5, further comprising:
performing, at the security chip,
transmitting the decrypted pre-symmetric key information to the AP as information associated with generation of a session key.

7. The operating method of claim 5, further comprising:
performing, at the security chip,
generating a session key according to the decrypted pre-symmetric key information; and
transmitting the session key to the AP.

8. The operating method of claim 1, further comprising:
performing, at the security chip,
receiving a separate certificate from an external server, the certificate including a server public key;
generating pre-symmetric key information according to first random data and second random data, the first random data generated internally at the security chip and the second random data received from the external server; and
generating encrypted pre-symmetric key information for transmission to the external server, based on encrypting the pre-symmetric key information according to the server public key.

9. The operating method of claim 8, further comprising:
performing, at the security chip,
transmitting the pre-symmetric key information to the AP as information associated with generation of a session key.

10. The operating method of claim 1, further comprising:
performing, at the security chip,
performing a handshake process according to a connection to an external device;
performing a session process based on completion of the handshake process;
wherein performing the session process includes selectively performing encryption and decryption operations according to a device private key.

11. A method, comprising:
generating, at an application processor (AP), a certificate form based on a device public key received from a semiconductor chip;
transmitting a request, from the AP to the semiconductor chip, to generate a digital signature associated with the certificate form, such that the semiconductor chip generates the digital signature;
receiving the requested digital signature from the semiconductor chip;
generating, at the AP, a certificate that includes the requested digital signature, based on receiving the requested digital signature from the semiconductor chip, the digital signature being generated at the semiconductor chip according to a certificate authority (CA) private key; and
transmitting the generated certificate to the semiconductor chip.

12. The method of claim 11, further comprising:
transmitting the generated certificate to an external device;
receiving encrypted pre-symmetric key information from the external device, wherein the encrypted pre-symmetric key information is encrypted according to the device public key included in the generated certificate; and
transmitting a request, to the semiconductor chip, to decrypt the encrypted pre-symmetric key information.

13. The method of claim 12, further comprising:
receiving decrypted pre-symmetric key information from the semiconductor chip, based on the decrypted pre-symmetric key information being decrypted from the encrypted pre-symmetric key information at the semiconductor chip; and
generating a session key according to the decrypted pre-symmetric key information.

14. The method of claim 12, wherein the transmitting the generated certificate to the external device further includes,
transmitting a request, to the semiconductor chip, to receive the generated certificate; and
transmitting the generated certificate, received from the semiconductor chip, to the external device.

15. The method of claim 11, further comprising:
receiving another certificate from an external device, the other certificate including a server public key;
decrypting the other certificate according to a certificate public key to generate a decrypted certificate;
transmitting, to the semiconductor chip, the server public key included in the decrypted certificate; and
receiving encrypted pre-symmetric key information from the semiconductor chip, wherein the encrypted pre-symmetric key information is encrypted at the semiconductor chip according to the transmitted server public key.

* * * * *